United States Patent
Fan et al.

(10) Patent No.: US 10,924,917 B2
(45) Date of Patent: *Feb. 16, 2021

(54) PROFILE DOWNLOAD METHOD AND SYSTEM, AND RELATED DEVICE

(71) Applicant: Huawei Technologies Co., Ltd., Shenzhen (CN)

(72) Inventors: Shunan Fan, Beijing (CN); Shuiping Long, Beijing (CN); Linyi Gao, Berkshire (GB)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/799,131

(22) Filed: Feb. 24, 2020

(65) Prior Publication Data

US 2020/0196131 A1 Jun. 18, 2020

Related U.S. Application Data

(63) Continuation of application No. 16/082,217, filed as application No. PCT/CN2016/075515 on Mar. 3, 2016, now Pat. No. 10,616,754.

(51) Int. Cl.
*H04W 8/20* (2009.01)
*H04W 12/00* (2009.01)
*H04W 8/18* (2009.01)
*H04W 12/06* (2009.01)

(52) U.S. Cl.
CPC .......... *H04W 8/205* (2013.01); *H04W 8/183* (2013.01); *H04W 12/0023* (2019.01); *H04W 12/06* (2013.01)

(58) Field of Classification Search
CPC ....... H04W 12/06; H04W 8/205; H04W 8/20; H04W 88/06; H04W 4/12; H04W 12/0023; H04W 8/183; H04W 12/04
See application file for complete search history.

(56) References Cited

U.S. PATENT DOCUMENTS 10,616,754 B2 * 4/2020 Fan .................. H04W 8/205
2013/0095794 A1 4/2013 Lhamon et al.
(Continued)

FOREIGN PATENT DOCUMENTS

CN 101578892 A 11/2009
CN 101600265 A 12/2009
(Continued)

OTHER PUBLICATIONS

Machine Translation and Abstract of Chinese Publication No. CN101600265, Dec. 9, 2009, 21 pages.
(Continued)

Primary Examiner — Diane D Mizrahi
(74) Attorney, Agent, or Firm — Conley Rose, P.C.

(57) ABSTRACT

A profile download method and system, and a related device are provided, and the method includes: obtaining, by a user terminal, local profile assistant LPA indication information, and obtaining download information required for downloading a target profile; and sending, by the user terminal, the download information to an embedded universal integrated circuit card eUICC if the LPA indication information instructs to download the profile by using an LPA in the eUICC, so that the eUICC downloads, by using the LPA in the eUICC, the target profile from a download server indicated by the download information. According to the method, the profile can be downloaded when an LPA is deployed in both the user terminal and the eUICC.

20 Claims, 13 Drawing Sheets

(56) References Cited

U.S. PATENT DOCUMENTS

| | | | |
|---|---|---|---|
| 2014/0143826 A1 | 5/2014 | Sharp et al. | |
| 2014/0349617 A1 | 11/2014 | Li et al. | |
| 2015/0281964 A1 | 10/2015 | Seo et al. | |
| 2015/0349826 A1 | 12/2015 | Li et al. | |
| 2016/0021529 A1 | 1/2016 | Park et al. | |
| 2017/0142121 A1 | 5/2017 | Lee et al. | |
| 2017/0149827 A1 | 5/2017 | Sims et al. | |
| 2019/0109948 A1 | 4/2019 | Yu et al. | |
| 2019/0158502 A1 | 5/2019 | Lee et al. | |
| 2019/0191298 A1 | 6/2019 | Kim et al. | |
| 2019/0327605 A1* | 10/2019 | Fan | H04W 8/205 |
| 2019/0394053 A1* | 12/2019 | Yu | H04L 63/0823 |
| 2020/0045544 A1* | 2/2020 | Yu | H04L 63/0869 |

FOREIGN PATENT DOCUMENTS

| | | | |
|---|---|---|---|
| CN | 104396289 A | 3/2015 | |
| CN | 104813634 A | 7/2015 | |
| CN | 105282732 A | 1/2016 | |
| EP | 1866792 B1 | 1/2014 | |
| WO | 2016003200 A1 | 1/2016 | |

OTHER PUBLICATIONS

"RSP Architecture Version 1.0," XP055507651, GSM Association, Dec. 23, 2015, 52 pages.
"RSP Technical Specification Version 1.0," XP055429434, GSM Association, Jan. 13, 2016, 114 pages.
"RSP Architecture Version 2.0," XP055404424, GSM Association, Aug. 23, 2016, 94 pages.
Yang, J., "Analysis and Suggestions on Key Issues in the Development of Telecom Operators eUICC", Special Issue of Guangdong Communications Youth Forum, 2015, 4 pages.
English Translation of Yang, J., "Analysis and Suggestions on Key Issues in the Development of Telecom Operators eUICC", Special Issue of Guangdong Communications Youth Forum, 2015, 6 pages.
Foreign Communication From a Counterpart Application, European Application No. 16892064.3, Extended European Search Report dated Nov. 7, 2018, 6 pages.
Foreign Communication From a Counterpart Application, PCT Application No. PCT/CN2016/075515, English Translation of International Search Report dated Nov. 30, 2016, 2 pages.
Foreign Communication From a Counterpart Application, PCT Application No. PCT/CN2016/075515, English Translation of Written Opinion dated Nov. 30, 2016, 5 pages.
Foreign Communication From a Counterpart Application, Chinese Application No. 201680066798.7, Chinese Office Action dated Nov. 27, 2019, 6 pages.
"RSP Architecture Version 2.0,GSM Association," XP055404424, Aug. 23, 2016, 94 pages.
"RSP Technical Specification Version 1.0,GSM Association," XP055429434, Jan. 13, 2016, 114 pages.
"RSP Architecture Version 1.0,GSM Association," XP055507651, Dec. 23, 2015, 52 pages.

* cited by examiner

PROFILE DOWNLOAD METHOD AND SYSTEM, AND RELATED DEVICE

CROSS REFERENCE TO RELATED APPLICATIONS

This application is a continuation of U.S. patent application Ser. No. 16/082,217, filed on Sep. 4, 2018, which is a National Stage of International Application No. PCT/CN2016/075515, filed on Mar. 3, 2016. All of the aforementioned applications are hereby incorporated by reference in their entireties.

TECHNICAL FIELD

The present invention relates to the field of communications technologies, and in particular, to a profile download method and system, and a related device.

BACKGROUND

An embedded universal integrated circuit card (embedded Universal Integrated Circuit Card, eUICC), also referred to as an embedded subscriber identity module (embedded Subscriber Identity Module, eSIM), is a secure element that may be used by a plurality of communications operators to remotely manage a subscriber. Usually, the eUICC may be placed in a user terminal (for example, a smartphone) through insertion or welding. A user may choose to subscribe to one or more communications operators based on the user's requirement, and download, by using a local profile assistant (local profile assistant, LPA) deployed in the user terminal, a profile (profile) provided by a subscribed communications operator. After the profile is installed in the eUICC, the user terminal may access an operator network (for example, a 2G/3G/4G network) that matches the profile.

However, an LPA may also be deployed in the eUICC. When an LPA is deployed in both the user terminal and the eUICC, and the profile needs to be downloaded, the LPA in the user terminal and the LPA in the eUICC conflict, and the profile cannot be downloaded. It can be learned that how to download a profile when an LPA is deployed in both a user terminal and an eUICC is a technical problem that is urgent to be resolved.

SUMMARY

Embodiments of the present invention disclose a profile download method and system, and a related device, so that a profile can be downloaded when an LPA is deployed in both a user terminal and an eUICC.

A first aspect of the embodiments of the present invention discloses a profile download method, including: obtaining, by a user terminal, local profile assistant LPA indication information, and obtaining download information required for downloading a target profile; and sending, by the user terminal, the download information to an embedded universal integrated circuit card eUICC if the LPA indication information instructs to download the profile by using an LPA in the eUICC, so that the eUICC downloads, by using the LPA in the eUICC, the target profile from a download server indicated by the download information.

When an LPA is deployed in both the user terminal and the eUICC, and the profile needs to be downloaded, the user terminal may obtain the LPA indication information, and select, based on the LPA indication information, the LPA in the eUICC or the LPA in the user terminal to download the target profile, so that the profile can be downloaded, and a conflict between the LPA in the user terminal and the LPA in the eUICC can be avoided.

With reference to the first aspect of the embodiments of the present invention, in a first possible implementation of the first aspect of the embodiments of the present invention, the obtaining, by a user terminal, local profile assistant LPA indication information includes: parsing, by the user terminal, an activation code to obtain the local profile assistant LPA indication information carried in the activation code; or sending, by the user terminal, a profile download request to the download server by using an LPA in the user terminal, and receiving the local profile assistant LPA indication information returned by the download server; or receiving, by the user terminal, the local profile assistant LPA indication information sent by the eUICC. The user terminal may obtain the LPA indication information in a plurality of manners, for example, obtain the LPA indication information from the activation code; or obtain the LPA indication information from the download server; or obtain the LPA indication information from the eUICC. In this way, the LPA indication information may be obtained in diverse manners. It should be noted that a manner of obtaining, by a user terminal, LPA indication information may include but is not limited to the foregoing three manners.

Optionally, scanning of the activation code may be triggered by using the LPA in the user terminal, or the activation code may be scanned by using any component in the user terminal, for example, the activation code is scanned by using a photographing component. With reference With reference to the first possible implementation of the first aspect of the embodiments of the present invention, in a second possible implementation of the first aspect of the embodiments of the present invention, a manner of receiving, by the user terminal, the local profile assistant LPA indication information sent by the eUICC is specifically: after the user terminal activates the eUICC, receiving, by the user terminal, the LPA indication information sent by the eUICC; or after the user terminal sends a request for obtaining authentication information of the eUICC to the eUICC, receiving, by the user terminal, the LPA indication information sent by the eUICC.

With reference to the first aspect of the embodiments of the present invention, in a third possible implementation of the first aspect of the embodiments of the present invention, the obtaining, by a user terminal, local profile assistant LPA indication information includes: sending, by the user terminal, a download information obtaining request to an operator portal server, and receiving the local profile assistant LPA indication information returned by the operator portal server; or sending, by the user terminal, a download information obtaining request to a subscription manager-discovery service SM-DS server, and receiving the local profile assistant LPA indication information returned by the SM-DS server, where the LPA indication information in the SM-DS server is carried in a notification message sent by a subscription manager-data preparation SM-DP server to the SM-DS server.

With reference to any one of the first aspect to the third possible implementation of the first aspect of the embodiments of the present invention, in a fourth possible implementation of the first aspect of the embodiments of the present invention, the method further includes: sending, by the user terminal, download verification information to the eUICC if the LPA indication information instructs to download the profile by using the LPA in the embedded universal integrated circuit card eUICC, where the download verification information includes at least one of the following: an acknowledgement code, an international mobile equipment identity of the user terminal, and a card identifier of the eUICC.

The acknowledgement code is separately sent by the download server to the user terminal. The acknowledgement code is used to determine whether the profile is requested by a valid user terminal or a valid eUICC. If yes, downloading is allowed; or if no, downloading is rejected.

With reference to any one of the first aspect to the third possible implementation of the first aspect of the embodiments of the present invention, in a fifth possible implementation of the first aspect of the embodiments of the present invention, the method further includes: if the LPA indication information instructs to download the profile by using the LPA in the user terminal, downloading, by the user terminal, the target profile from the download server by using the LPA in the user terminal, and sending the target profile to the eUICC.

If the LPA indication information instructs to download the profile by using the LPA in the user terminal, the user terminal downloads the profile based on a normal procedure, and sends the profile to the eUICC.

With reference to any one of the first aspect to the fifth possible implementation of the first aspect of the embodiments of the present invention, in a sixth possible implementation of the first aspect of the embodiments of the present invention, before the obtaining, by a user terminal, local profile assistant LPA indication information, the method further includes: activating, by the user terminal, the eUICC, and receiving eUICC deployment information that is sent by the eUICC and that is used to indicate that an LPA is deployed in the eUICC.

An eUICC activation process is started when the user terminal is powered on. In the eUICC activation process, the user terminal provides a voltage and a clock for the eUICC, and the eUICC returns answer to reset ATR information to the modem modem in the user terminal, and executes a required protocol and parameter selection PPS process. The ATR information carries the eUICC deployment information used to indicate that an LPA is deployed in the eUICC.

With reference to the first possible implementation of the first aspect of the embodiments of the present invention, in a seventh possible implementation of the first aspect of the embodiments of the present invention, the download information includes at least one of the following: the activation code, an address of the download server, an equipment identity of the download server, and an identifier of the target profile.

A second aspect of the embodiments of the present invention discloses a profile download method, including: receiving, by an embedded universal integrated circuit card eUICC, download information sent by a user terminal; and downloading, by the eUICC by using an LPA in the eUICC, a target profile from a download server indicated by the download information.

Usually, the user terminal does not send the download information to the eUICC. If the eUICC receives the download information sent by the user terminal, it indicates that a profile needs to be downloaded by using the LPA in the eUICC. In this case, the eUICC may download, by using the LPA in the eUICC, the target profile from the download server indicated by the download information.

With reference to the second aspect of the embodiments of the present invention, in a first possible implementation of the second aspect, the downloading, by the eUICC by using an LPA in the eUICC, a target profile from a download server indicated by the download information includes: sending, by the eUICC by using the LPA in the eUICC to the download server indicated by the download information, a profile download request used to request to download the target profile; and receiving, by the eUICC, a download allowing response sent by the download server in response to the profile download request, and downloading the target profile from the download server.

A third aspect of the embodiments of the present invention discloses a profile download method, including: receiving, by a download server, a profile download request used to request to download a target profile; determining, by the download server, that the target profile is a profile that needs to be downloaded by using a local profile assistant LPA in an embedded universal integrated circuit card eUICC; and determining, by the download server, whether the profile download request is sent by using the LPA in the eUICC, and if yes, sending, by the download server, a download allowing response to the eUICC, to allow the eUICC to download the target profile.

With reference to the third aspect, in a first possible implementation of the third aspect, the method further includes: sending, by the download server, a download rejection response to a user terminal if the profile download request is sent by using an LPA in the user terminal; and sending, by the download server to the user terminal, LPA indication information used to instruct to download the profile by using the LPA in the eUICC, so that the user terminal sends, to the eUICC, download information required for downloading the profile, and the eUICC downloads the target profile from the download server by using the LPA in the eUICC.

A fourth aspect of the embodiments of the present invention discloses a profile download apparatus. The profile download apparatus is applied to a user terminal. The profile download apparatus includes a functional unit configured to perform some or all steps of any method in the first aspect of the embodiments of the present invention. A profile can be downloaded when the profile download apparatus performs some or all steps of any method in the first aspect.

A fifth aspect of the embodiments of the present invention discloses a profile download apparatus. The profile download apparatus is applied to an embedded universal integrated circuit card eUICC. The profile download apparatus includes a functional unit configured to perform some or all steps of any method in the second aspect of the embodiments of the present invention. A profile can be downloaded when the profile download apparatus performs some or all steps of any method in the second aspect.

A sixth aspect of the embodiments of the present invention discloses a profile download apparatus. The profile download apparatus is applied to a download server. The profile download apparatus includes a functional unit configured to perform some or all steps of any method in the third aspect of the embodiments of the present invention. A profile can be downloaded when the profile download apparatus performs some or all steps of any method in the third aspect.

A seventh aspect of the embodiments of the present invention discloses a user terminal, and the user terminal includes a processor, a receiver, a transmitter, and a memory. The memory is configured to store an instruction, and the processor is configured to run the instruction. The processor runs the instruction to perform some or all steps of any method in the first aspect of the embodiments of the present invention. A profile can be downloaded when the user terminal performs some or all steps of any method in the first aspect.

An eighth aspect of the embodiments of the present invention discloses an embedded universal integrated circuit card eUICC, and the eUICC includes a processor and a memory. The memory is configured to store an instruction, and the processor is configured to run the instruction. The processor runs the instruction to perform some or all steps of any method in the second aspect of the embodiments of the present invention. A profile can be downloaded when the eUICC performs some or all steps of any method in the second aspect.

A ninth aspect of the embodiments of the present invention discloses a download server, and the download server includes a processor, a receiver, a transmitter, and a memory. The memory is configured to store an instruction, and the processor is configured to run the instruction. The processor runs the instruction to perform some or all steps of any method in the third aspect of the embodiments of the present invention. A profile can be downloaded when the download server performs some or all steps of any method in the third aspect.

A tenth aspect of the embodiments of the present invention discloses a profile download system, including the user terminal according to the seventh aspect, the eUICC according to the eighth aspect, and the download server according to the ninth aspect.

An eleventh aspect of the embodiments of the present invention discloses a computer storage medium, and the computer storage medium stores a program. The program specifically includes an instruction used to perform some or all of the steps of any method in the first aspect of the embodiments of the present invention.

A twelfth aspect of the embodiments of the present invention discloses a computer storage medium, and the computer storage medium stores a program. The program specifically includes an instruction used to perform some or all of the steps of any method in the second aspect of the embodiments of the present invention.

A thirteenth aspect of the embodiments of the present invention discloses a computer storage medium, and the computer storage medium stores a program. The program specifically includes an instruction used to perform some or all of the steps of any method in the third aspect of the embodiments of the present invention.

In some feasible implementations, an eUICC may send, to a user terminal, prompt information used to indicate that a target profile is successfully downloaded to the eUICC.

In some feasible implementations, a download server may generate download information and a profile in advance. The profile may be generated immediately when the profile is requested from the download server, or may be generated by the download server in advance and stored in the download server.

In some feasible implementations, the download server may further generate attribute information (Profile metadata) of the target profile, and send the profile metadata to the eUICC and an LPA, and the LPA presents the profile metadata to a user. The profile metadata may be, for example, a profile identifier, a profile name, an operator name, or an alternative profile name. In addition, LPA indication information of the target profile may be specified in the profile metadata.

In some feasible implementations, the download server may further specify the LPA indication information of the target profile.

In some feasible implementations, after the user terminal receives eUICC deployment information, if an LPA is also deployed in the user terminal, the user terminal may send, to the eUICC, user terminal deployment information used to indicate that an LPA is deployed in the user terminal. In this way, both the user terminal and the eUICC learn that an LPA is deployed in the other party.

In some feasible implementations, the user terminal may receive the prompt information that is used to indicate that the profile is successfully downloaded to the eUICC and that is sent by the eUICC, and output the prompt information by using a user interface of the user terminal. In this way, the prompt information is intuitively output, and user experience is improved.

In the embodiments of the present invention, the user terminal may first obtain the local profile assistant LPA indication information, and obtain the download information required for downloading the target profile. Further, if the LPA indication information instructs to download the profile by using the LPA in the embedded universal integrated circuit card eUICC, the user terminal may send the download information to the eUICC, so that the eUICC downloads, by using the LPA in the eUICC, the target profile from the download server indicated by the download information. It can be learned that according to the embodiments of the present invention, when an LPA is deployed in both the user terminal and the eUICC, and the profile needs to be downloaded, the user terminal may obtain the LPA indication information, and select, based on the LPA indication information, the LPA in the eUICC or the LPA in the user terminal to download the profile, so that the profile can be downloaded, and a conflict between the LPA in the user terminal and the LPA in the eUICC can be avoided.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", and so on are intended to distinguish between different objects but do not indicate a particular order. In addition, the terms "include", "have", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The embodiments of the present invention disclose a profile download method and system, and a related device, so that a profile can be downloaded when an LPA is deployed in both a user terminal and an eUICC.

Figure 1:
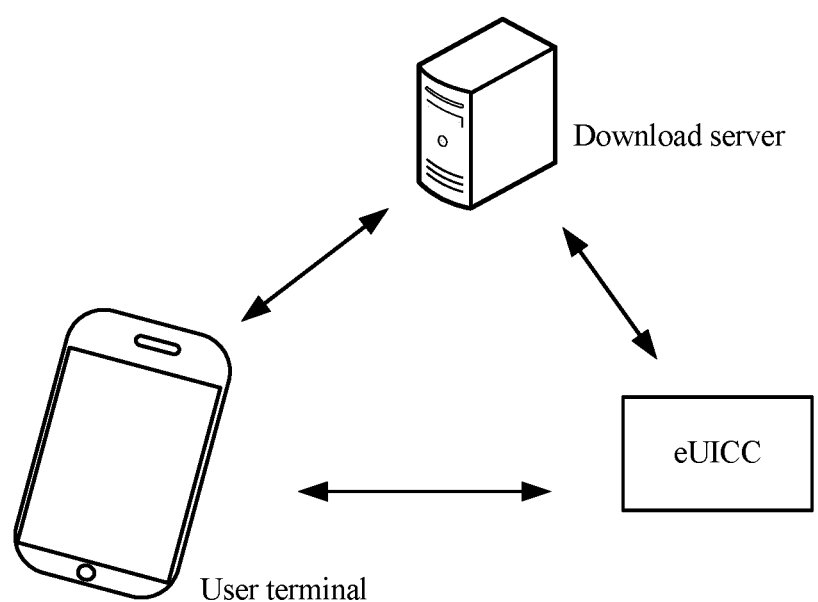
FIG. 1 is a schematic diagram of a network architecture of a profile download system according to an embodiment of the present invention.

To better understand the embodiments of the present invention, a network architecture to which the embodiments of the present invention are applicable is first described in the following. Referring to FIG. 1, FIG. 1 is a schematic diagram of a network architecture of a profile download system according to an embodiment of the present invention. As shown in FIG. 1, the network architecture may include a download server, a user terminal, and an embedded universal integrated circuit card eUICC. The user terminal and the eUICC may include a local profile assistant LPA each.

The eUICC may be welded to the user terminal before the user terminal is delivered. In other words, the user terminal and the eUICC are integrated as a whole. Alternatively, the eUICC may be installed on the user terminal through insertion. In other words, the user terminal and the eUICC are independently deployed.

The LPA is used for discovering subscription manager-secure routing (Subscription Manager-Secure Routing, SM-SR), managing profile (Profile) download, and providing a user with a user interface UI interface (for example, an eUICC management interface), so that the user manages a profile in the eUICC (for example, activates, forbids, and deletes the profile).

For example, the download server may include at least one of an operator network server (Mobile Network Operator, MNO), an operator portal (Portal) server, a subscription manager-data preparation (Subscription Manager-Data Preparation, SM-DP) server, a subscription manager-secure routing (Subscription Manager-Security Route, SM-SR) server, and a subscription manager-discovery service (Subscription Manager-Discovery Service, SM-DS) server. The download server may generate a profile required by the eUICC to access a corresponding operator network server, and send the profile to the eUICC, so that the profile is installed in the eUICC. The profile of the eUICC may be generated immediately when the profile is requested from the download server, or may be generated by the download server in advance and stored in the download server. When the profile is requested, the download server may allocate the prestored profile to the eUICC that requests the profile.

For example, the user terminal may include various electronic devices, such as a mobile phone, a tablet computer, a personal digital assistant (Personal Digital Assistant, PDA), a television, an in-vehicle device, a machine-to-machine (Machine-to-Machine, M2M) device, a mobile Internet device (Mobile Internet Device, MID), and an intelligent wearable device (such as a smart watch or a smart band).

In the network architecture shown in FIG. 1, the user terminal may interact with the download server by using the LPA in the user terminal, the eUICC may interact with the download server by using the LPA in the eUICC, and the LPA in the user terminal may interact with the LPA in the eUICC. In addition, the LPA may include a local discovery service (Local Discovery Service, LDS), local profile download (Local Profile Download, LPD), and a local user interface UI interface (Local User Interface, LUI). The LPA in the user terminal and the LPA in the eUICC may each include one or more of the LDS, the LPD, and the LUI. By implementing the network architecture shown in FIG. 1, a profile can be downloaded when an LPA is deployed in both the user terminal and the eUICC.

Figure 2A:
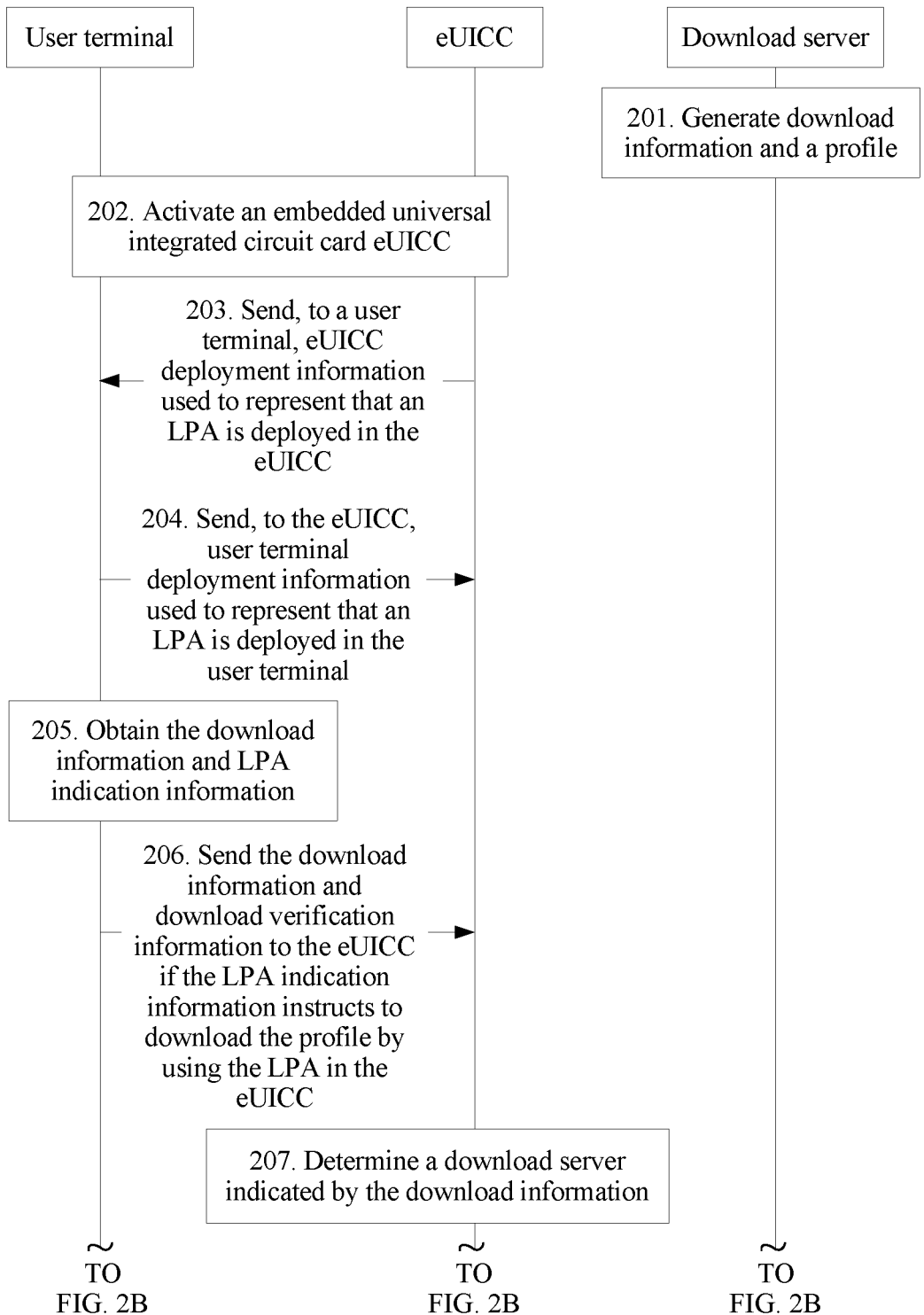
FIG. 2A and FIG. 2B are a schematic flowchart of a profile download method according to an embodiment of the present invention.
Figure 2B:
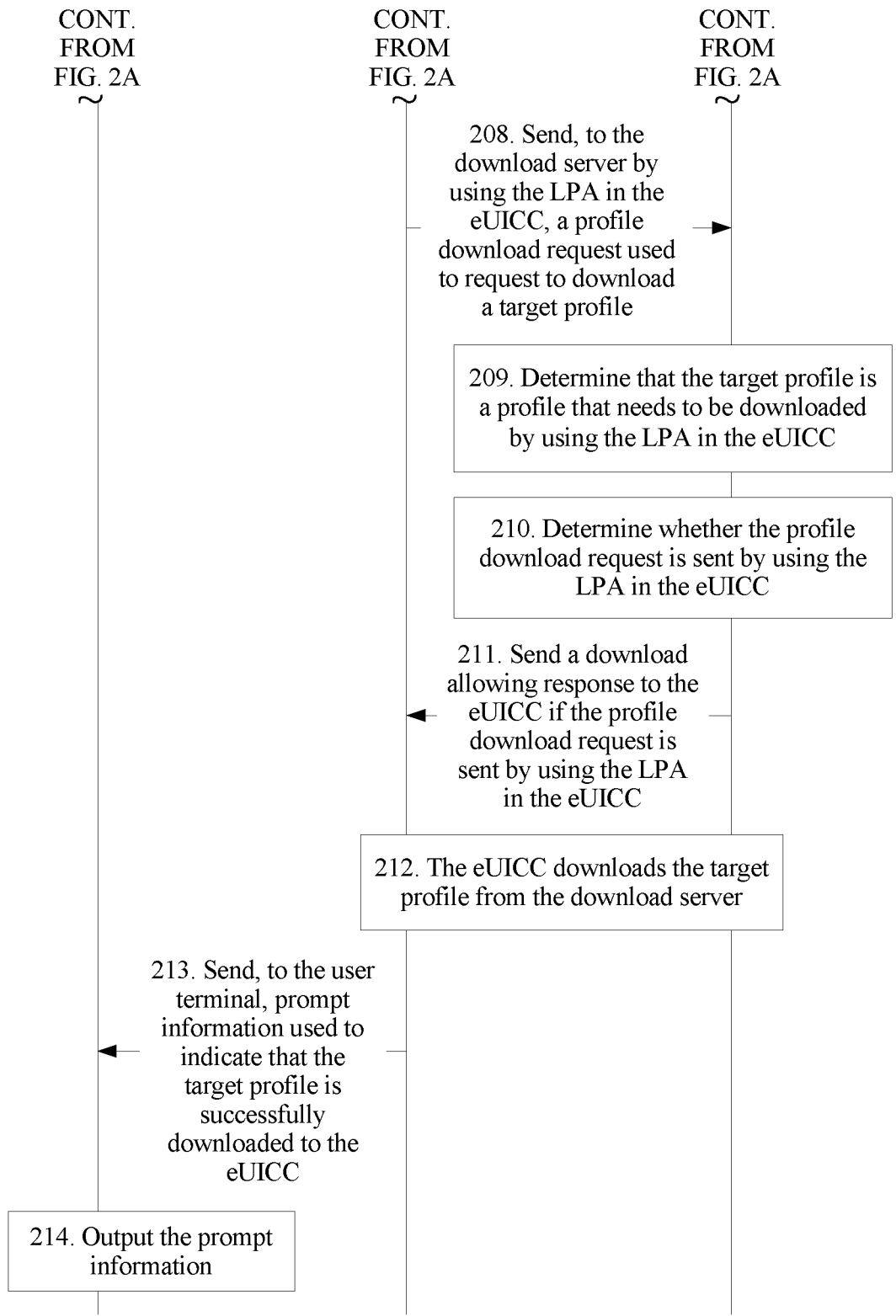

Based on the network architecture shown in FIG. 1, the embodiments of the present invention disclose a profile download method. Referring to FIG. 2A and FIG. 2B, FIG. 2A and FIG. 2B are a schematic flowchart of a profile download method according to an embodiment of the present invention. The method is described from a plurality of perspectives of a user terminal, an eUICC, a download server, and the like, and an LPA is deployed in both the user terminal and the eUICC. As shown in FIG. 2A and FIG. 2B, the profile download method may include the following steps.

201. The download server generates download information and a profile.

In this embodiment of the present invention, a user may choose to subscribe to one or more communications operators based on the user's requirement, and download, by using a local profile assistant (Local Profile Assistant, LPA) deployed in the user terminal, a profile (profile) provided by a subscribed communications operator. After the profile is installed in the eUICC, the user terminal may access an operator network (for example, a 2G/3G/4G/5G/WiFi network) that matches the profile. In addition, the user may select another operator. In this case, a profile provided by the another operator for the user needs to be downloaded, and operator network switching may be implemented after the profile is installed in the eUICC. The operator may include but is not limited to a national operator and a foreign operator.

When the user chooses to subscribe to an operator, a download server of the operator may generate download information and a profile for the user. The download server may include at least one of network side devices such as an MNO, an SM-DS, an SM-DP, and an SM-DR. The download information may be an activation code (Activation Code, AC) or a parameter directly defined in a form of a key-value key-value pair, for example, may include at least one of LPA indication information, an address of the download server, an equipment identity of the download server, and a profile identifier.

When the download information is an AC, the AC may be a two-dimensional code. The two-dimensional code may be temporarily generated by a download server of an operator for the user when the user subscribes to the operator, or the two-dimensional code may be generated by the download server of the operator in advance. The AC may carry the LPA indication information and download information required for obtaining and downloading a target profile. The user may scan the AC by using the user terminal, to obtain the LPA indication information and the download information that are carried in the AC. The LPA indication information is used to instruct to download the profile by using the LPA in the eUICC. For example, LPA indicator=1 instructs to download the profile by using the LPA in the eUICC. Alternatively, the LPA indication information is used to instruct to download the profile by using the LPA in the user terminal. For example, LPA indicator=0 instructs to download the profile by using the LPA in the user terminal. The address of the download server may be an IP address, a uniform resource locator (Universal Resource Locator, URL) address, a domain name system resolution address, an IP multimedia subsystem (IP Multimedia Subsystem, IMS) address, or an address of another type. The equipment identity of the download server may be a device ID of the download server or a device name of the download server. The profile identifier may be a real identifier of the profile stored in the download server, or may be a matching identifier, for example, a matching ID (Matching ID), of the profile stored in the download server, to protect a real profile identifier.

If the profile identifier is provided in the download information, a target profile that matches the profile identifier is a profile generated by the operator for the user when the user subscribes to the operator. The target profile is used to access a network service of the subscribed operator. Therefore, when the user subscribes to the operator, the target profile is specified correspondingly. For example, if the user subscribes to a service package of an operator of a nation, a corresponding number resource, a corresponding access parameter, and the like are allocated.

Optionally, attribute information (Profile metadata) of the target profile may be further generated. The profile metadata is sent to the eUICC and the LPA in the user terminal, and the LPA in the user terminal presents the profile metadata to the user. The profile metadata may be, for example, a profile identifier, a profile name, an operator name, or an alternative profile name In addition, LPA indication information of the target profile may be specified in the profile metadata.

202. The user terminal activates the embedded universal integrated circuit card eUICC.

In this embodiment of the present invention, an eUICC activation process is started when the user terminal is powered on. In the eUICC activation process, the user terminal performs operations such as providing a voltage and a clock for the eUICC.

203. The eUICC sends, to the user terminal, eUICC deployment information used to indicate that an LPA is deployed in the eUICC.

In this embodiment of the present invention, in the eUICC activation process, the eUICC returns answer to reset (Answer To Reset, ATR) information to a modem (modem) of the user terminal, and executes a required protocol and parameter selection (Protocol and Parameter Selection, PPS) process. The ATR information carries the eUICC deployment information used to indicate that an LPA is deployed in the eUICC. It may be understood that "an LPA is deployed in the eUICC" means that an application program having an LPA function is installed in the eUICC, or means that the eUICC supports an LPA function. In addition, the ATR information may include an interface characteristic, a historical byte, and the like.

204. The user terminal sends, to the eUICC, user terminal deployment information used to indicate that an LPA is deployed in the user terminal.

In this embodiment of the present invention, after the user terminal receives the eUICC deployment information sent by the eUICC, the user terminal may send, to the eUICC, the user terminal deployment information used to indicate that an LPA is deployed in the user terminal. For example, the user terminal sends capability information (Terminal Capability) of the user terminal to the eUICC by using the modem of the user terminal. The capability information carries the user terminal deployment information used to indicate that an LPA is deployed in the user terminal. It may be understood that "an LPA is deployed in the user terminal" means that an application program having an LPA function is installed in the user terminal, or means that the user terminal supports an LPA function. In this way, both the user terminal and the eUICC learn that an LPA is deployed in the other party.

Optionally, after the user terminal receives the eUICC deployment information sent by the eUICC, the user terminal may further send the eUICC deployment information to the LPA in the user terminal. For example, the user terminal sends an AT command (attention command) to the LPA in the user terminal by using the modem of the user terminal, and the AT command carries the eUICC deployment information used to indicate that an LPA is deployed in the eUICC.

It should be noted that the deployment information exchanged between the user terminal and the eUICC may include that all LPA functions or some LPA functions are deployed. To be specific, at least one of an LDS, LPD, and an LUI may be deployed in both the user terminal and the eUICC. For example, the LPD and the LUI are deployed in the user terminal, and the LPD is deployed in the eUICC.

205. The user terminal obtains the download information and LPA indication information.

In this embodiment of the present invention, when the download information is an activation code, the user terminal may scan and parse the activation code, to obtain the LPA indication information carried in the activation code, and obtain the download information required for downloading the target profile.

In this embodiment of the present invention, the user terminal may send an activation code obtaining request to the download server, and receive the activation code sent by the download server; or the user terminal may directly obtain the activation code from the download server.

Optionally, the user terminal may trigger scanning of the activation code by using the LPA in the user terminal, or may scan the activation code by using any component in the user terminal, for example, scan the activation code by using a photographing component.

In an optional implementation, a manner in which the user terminal obtains the download information and the LPA indication information may be specifically:

sending, by the user terminal, a download information obtaining request to an operator portal server, and receiving the download information and the LPA indication information that are returned by the operator portal server; or sending, by the user terminal, a download information obtaining request to a subscription manager-discovery service SM-DS server, and receiving the download information and the LPA indication information that are returned by the SM-DS server.

The LPA indication information in the SM-DS server is carried in a notification message sent by a subscription manager-data preparation SM-DP server to the SM-DS server. The notification message is used to indicate that the SM-DP server generates the target profile for the user terminal. Optionally, the notification message further carries information about the SM-DP server, for example, an equipment identity of the SM-DP server.

In this optional implementation, the user terminal may directly obtain the download information and the LPA indication information without scanning the activation code. Specifically, the user terminal may request to obtain the download information and the LPA indication information from the operator portal server. For example, the user browses, by using the user terminal, a portal site launched by an operator, subscribes to a profile, and applies to access a network service of the operator. After the network service is accessed, the operator portal server returns download information and LPA indication information of the subscribed profile to the user terminal.

Alternatively, the user terminal may request, by using an LDS in the user terminal, to obtain the download information and the LPA indication information from the SM-DS server. Specifically, the SM-DS server may extract the LPA indication information from the notification message sent by the SM-DP server. When the SM-DS server receives the download information obtaining request sent by the user terminal, the SM-DS server may send the LPA indication information to the user terminal.

206. The user terminal sends the download information and download verification information to the eUICC if the LPA indication information instructs to download the profile by using the LPA in the eUICC.

In this embodiment of the present invention, if the LPA indication information instructs to download the profile by using the LPA in the eUICC, the user terminal cannot download the profile by using the LPA in the user terminal. In this case, the user terminal needs to send the download information to the eUICC, to trigger the eUICC to download the profile by using the LPA in the eUICC.

Specifically, the user terminal may send the download information and the download verification information to the LPA in the eUICC by using an interface between the LPA in the user terminal and the eUICC. The download verification information is verification information related to current downloading that is obtained by the LPA in the user terminal, for example, information such as an acknowledgement code, an international mobile equipment identity of the user terminal, or a card identifier of the eUICC. The acknowledgement code is separately sent by the download server to the user terminal. The acknowledgement code is used to determine whether the profile is requested by a valid user terminal or a valid eUICC. If yes, downloading is allowed; or if no, downloading is rejected.

Optionally, if the LPA indication information instructs to download the profile by using the LPA in the eUICC, the user terminal may simultaneously send the download information and the download verification information to the eUICC; or the user terminal may first send the download information to the eUICC, and then send the download verification information to the eUICC; or the user terminal may first send the download verification information to the eUICC, and then send the download information to the eUICC.

207. The eUICC determines the download server indicated by the download information.

In this embodiment of the present invention, after the eUICC receives the download information and the download verification information that are sent by the user terminal, the eUICC may determine the download server indicated by the download information. Specifically, the eUICC may obtain the address of the download server from the download information, to determine the download server.

208. The eUICC sends, to the download server by using the LPA in the eUICC, a profile download request used to request to download a target profile.

In this embodiment of the present invention, after the eUICC determines the download server indicated by the download information, the eUICC may send, to the download server by using the LPA in the eUICC, the profile download request used to request to download the target profile. The profile download request carries the obtained download verification information.

Specifically, the eUICC may send the address of the download server, the acknowledgement code, and the profile identifier to an LPD included in the LPA in the eUICC, to trigger the LPD in the eUICC to send, to the download server by using an interface between the LPD and the download server, the profile download request used to request to download the target profile.

209. The download server determines that the target profile is a profile that needs to be downloaded by using the LPA in the eUICC.

In this embodiment of the present invention, after the download server receives the profile download request used to request to download the target profile, the download server may determine, by querying the attribute information of the target profile, whether the target profile is a profile that needs to be downloaded by using the LPA in the eUICC.

210. The download server determines whether the profile download request is sent by using the LPA in the eUICC.

In this embodiment of the present invention, after the download server determines that the target profile is a profile that needs to be downloaded by using the LPA in the eUICC, the download server further needs to determine whether the profile download request is sent by using the LPA in the eUICC.

Specifically, the download server may check whether the profile download request is sent by using an interface between the LPA in the eUICC and the download server. If yes, it may be determined that the profile download request is sent by using the LPA in the eUICC.

211. The download server sends a download allowing response to the eUICC if the profile download request is sent by using the LPA in the eUICC.

Before sending the download allowing response to the eUICC, the download server may first determine whether the download verification information is correct. If the download verification information is correct, the eUICC to which the LPA that sends the profile request belongs is a valid eUICC that applies for the target profile. If the download verification information is incorrect, the eUICC to which the LPA that sends the profile request belongs is invalid, and downloading is rejected. For example, it may be determined, based on the acknowledgement code, whether the eUICC that sends the profile request is a valid eUICC, and further, a profile associated with the eUICC may be searched for based on the card identifier of the eUICC.

212. The eUICC downloads the target profile from the download server.

In this embodiment of the present invention, after the eUICC receives the download allowing response sent by the download server, the eUICC may download the target profile from the download server by using the LPA in the eUICC.

213. The eUICC sends, to the user terminal, prompt information used to indicate that the target profile is successfully downloaded to the eUICC.

In this embodiment of the present invention, when the target profile is successfully downloaded to the eUICC, the eUICC may send, to the user terminal, the prompt information used to indicate that the target profile is successfully downloaded to the eUICC. Specifically, the prompt information may be sent to an LUI included in the LPA in the user terminal.

214. The user terminal outputs the prompt information.

In this embodiment of the present invention, after the user terminal receives the prompt information that is used to indicate that the target profile is successfully downloaded to the eUICC and that is sent by the eUICC, the user terminal may output the prompt information.

Specifically, the prompt information may be output by using the LUI included in the LPA in the user terminal. In this way, the user intuitively learns that the target profile is successfully downloaded to the eUICC, and user experience can be improved.

In an optional implementation, if the LPA indication information instructs to download the profile by using the LPA in the user terminal, the user terminal downloads the target profile from the download server by using the LPA in the user terminal, and sends the target profile to the eUICC.

Specifically, in this optional implementation, if the LPA indication information instructs to download the profile by using the LPA in the user terminal, the user terminal may send, to the download server by using an LPD included in the LPA in the user terminal, a profile download request used to request to download the target profile. After receiving a download allowing response sent by the download server, the user terminal may download the target profile from the download server by using the LPA in the user terminal. Further, the user terminal may send the downloaded target profile to the eUICC, to install the target profile in the eUICC. After the target profile is successfully installed in the eUICC, the user terminal may output, by using the LUI included in the LPA in the user terminal, prompt information used to indicate that the target profile is successfully downloaded to the eUICC.

It should be noted that the operations performed by the user terminal may also be performed by the LPA in the user terminal.

In the method procedure described in FIG. 2A and FIG. 2B, when an LPA is deployed in both the user terminal and the eUICC, and the profile needs to be downloaded, the user terminal may obtain the LPA indication information by scanning the activation code, and select, based on the LPA indication information, the LPA in the eUICC or the LPA in the user terminal to download the profile, so that the profile can be downloaded, and a conflict between the LPA in the user terminal and the LPA in the eUICC can be avoided.

Figure 3A:
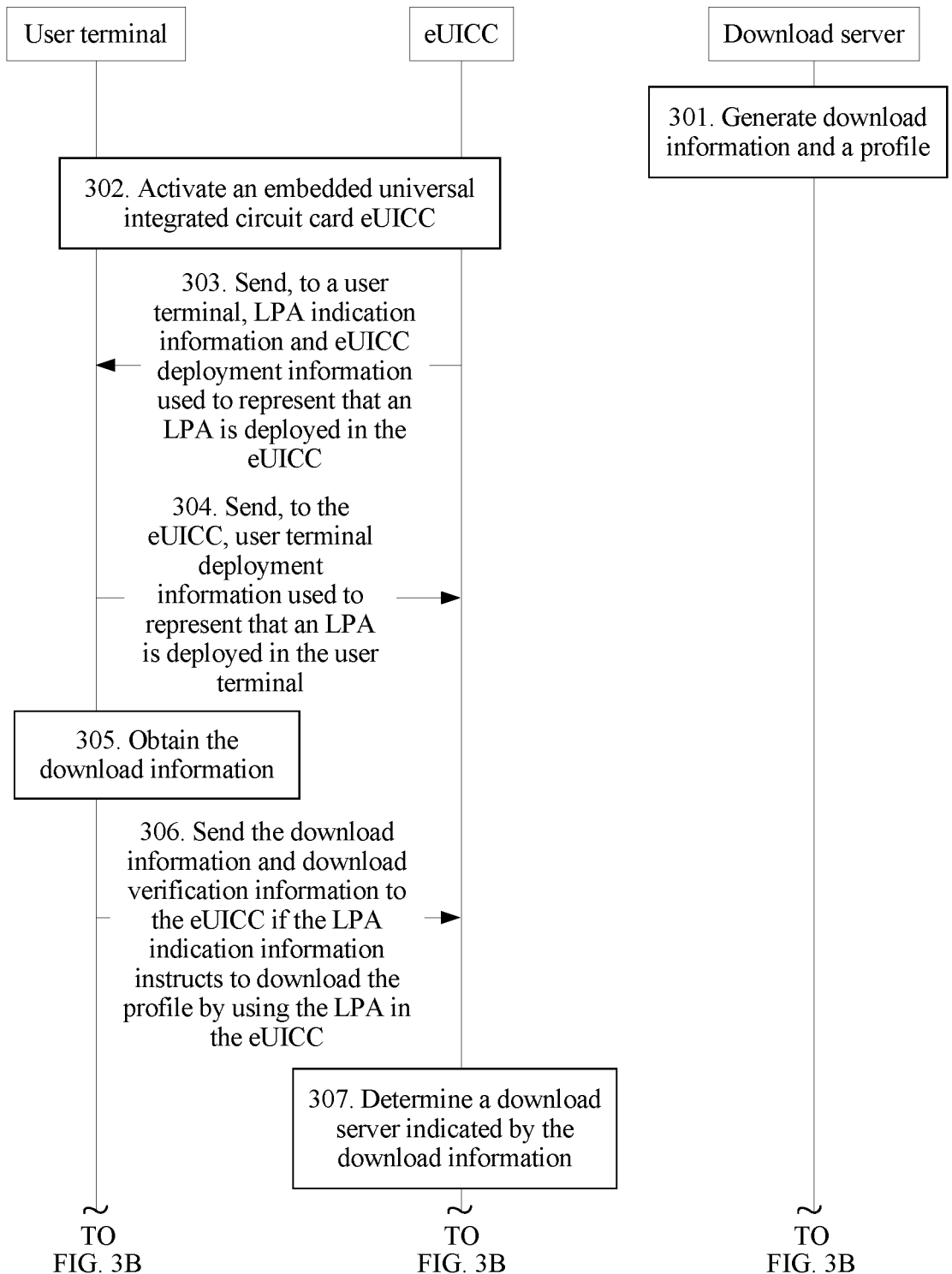
FIG. 3A and FIG. 3B are a schematic flowchart of another profile download method according to an embodiment of the present invention.
Figure 3B:
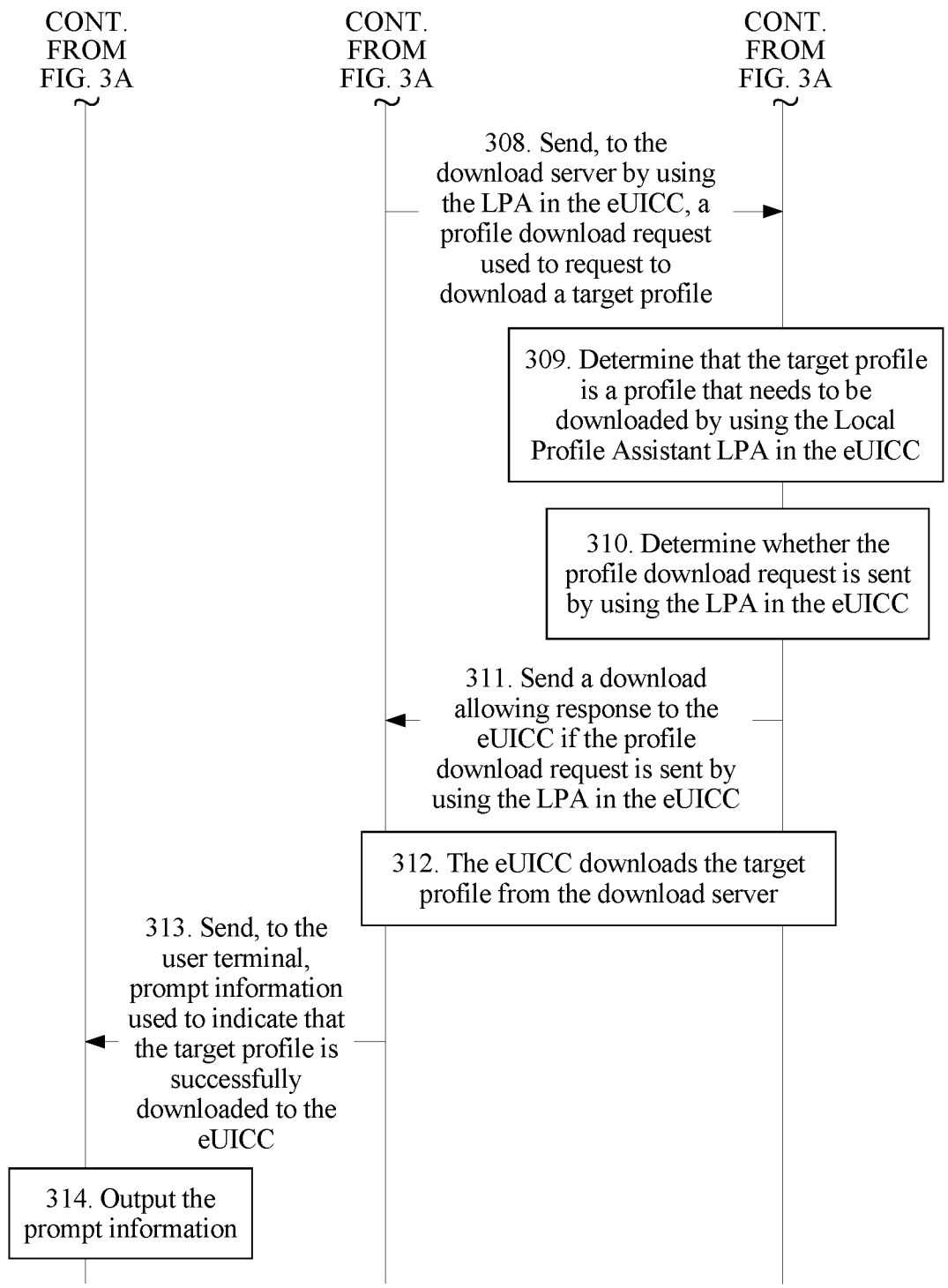

Based on the network architecture shown in FIG. 1, the embodiments of the present invention disclose a profile download method. Referring to FIG. 3A and FIG. 3B, FIG. 3A and FIG. 3B are a schematic flowchart of another profile download method according to an embodiment of the present invention. The method is described from a plurality of perspectives of a user terminal, an eUICC, a download server, and the like, and an LPA is deployed in both the user terminal and the eUICC. As shown in FIG. 3A and FIG. 3B, the profile download method may include the following steps.

301. The download server generates download information and a profile.

In this embodiment of the present invention, the download information may be an activation code (Activation Code, AC) or a parameter directly defined in a form of a key-value key-value pair, for example, may include at least one of an address of an SM-DP server, an SM-DP identifier, and a profile identifier. When the download information is an activation code, the activation code may carry download information required for downloading the profile, for example, an address of the download server, an equipment identity of the download server, and the profile identifier.

It should be noted that in this embodiment of the present invention, the activation code does not carry LPA indication information.

302. The user terminal activates the embedded universal integrated circuit card eUICC.

303. The eUICC sends, to the user terminal, LPA indication information and eUICC deployment information used to indicate that an LPA is deployed in the eUICC.

In this embodiment of the present invention, before the eUICC is delivered, the LPA indication information of the eUICC may be set in the eUICC, to notify the eUICC that the profile needs to be downloaded to the eUICC by using the LPA in the eUICC. The eUICC may send the LPA indication information when sending, to the user terminal, the eUICC deployment information used to indicate that an LPA is deployed in the eUICC.

304. The user terminal sends, to the eUICC, user terminal deployment information used to indicate that an LPA is deployed in the user terminal.

In this embodiment of the present invention, after the user terminal receives the eUICC deployment information sent by the eUICC, the user terminal may send, to the eUICC, the user terminal deployment information used to indicate that an LPA is deployed in the user terminal. In this way, both the user terminal and the eUICC learn that an LPA is deployed in the other party.

In an optional implementation, after the user terminal receives the LPA indication information sent by the eUICC, if the LPA indication information instructs to download the profile by using the LPA in the eUICC, the user terminal may send the LPA indication information to the LPA in the user terminal, or the user terminal may directly forbid using the LPA in the user terminal. If the user terminal forbids using the LPA in the user terminal, when a user triggers using of the LPA in the user terminal to download the profile, the LPA in the user terminal cannot be enabled, and only the LPA in the eUICC can be enabled. However, the user may download the profile without sensing LPA switching, so that user experience can be improved.

305. The user terminal obtains the download information.

In this embodiment of the present invention, when the download information is an activation code, the user terminal may scan and parse the activation code, to obtain the download information that is required for downloading the profile and that is carried in the activation code.

In this embodiment of the present invention, the user terminal may send an activation code obtaining request to the download server, and receive the activation code sent by the download server; or the user terminal may directly obtain the activation code from the download server. Optionally, the user terminal may trigger scanning of the activation code by using the LPA in the user terminal, or may scan the activation code by using any component in the user terminal, for example, scan the activation code by using a photographing component.

In an optional implementation, a manner in which the user terminal obtains the download information may be specifically:

sending, by the user terminal, a download information obtaining request to an operator portal server, and receiving the download information returned by the operator portal server; or sending, by the user terminal, a download information obtaining request to a subscription manager-discovery service SM-DS server, and receiving the download information returned by the SM-DS server.

In this optional implementation, the user terminal may directly obtain the download information without scanning the activation code. Specifically, the user terminal may request to obtain the download information from the operator portal server. For example, the user browses, by using the user terminal, a portal site launched by an operator, subscribes to a profile, and applies to access a network service of the operator. After the network service is accessed, the operator portal server returns download information of the subscribed profile to the user terminal.

Alternatively, the user terminal may request to obtain the download information from the SM-DS server by using an LDS in the user terminal. In this way, the download information returned by the SM-DS server can be received.

In another optional implementation, if the user terminal receives the eUICC deployment information sent by the eUICC but does not receive the LPA indication information, the user terminal may send a request for obtaining authentication information of the eUICC to the eUICC, and receive the LPA indication information sent by the eUICC.

In this optional implementation, the user terminal sends the request for obtaining the authentication information of the eUICC to the eUICC. After receiving the request for obtaining the authentication information of the eUICC, the eUICC may send the authentication information of the eUICC and/or the LPA indication information to the user terminal. The request for obtaining the authentication information of the eUICC may be a get-eUICC challenge (get-eUICC challenge) message, and the authentication information of the eUICC is used for bidirectional authentication between the download server and the eUICC. If the LPA indication information received by the user terminal instructs to download the profile by using the LPA in the eUICC, the user terminal does not need to send the authentication information of the eUICC to the download server to perform bidirectional authentication between the download server and the eUICC.

306. The user terminal sends the download information and download verification information to the eUICC if the LPA indication information instructs to download the profile by using the LPA in the eUICC.

307. The eUICC determines the download server indicated by the download information.

308. The eUICC sends, to the download server by using the LPA in the eUICC, a profile download request used to request to download a target profile.

The profile download request may carry the download verification information.

Specifically, the eUICC may send the address of the download server, an acknowledgement code, and the profile identifier to an LPD included in the LPA in the eUICC, to trigger the LPD in the eUICC to send, to the download server by using an interface between the LPD and the download server, the profile download request used to request to download the target profile.

309. The download server determines that the target profile is a profile that needs to be downloaded by using the local profile assistant LPA in the eUICC.

310. The download server determines whether the profile download request is sent by using the LPA in the eUICC.

311. The download server sends a download allowing response to the eUICC if the profile download request is sent by using the LPA in the eUICC.

Before sending the download allowing response to the eUICC, the download server may first determine whether the download verification information is correct. If the download verification information is correct, the eUICC to which the LPA that sends the profile request belongs is a valid eUICC that applies for the target profile. If the download verification information is incorrect, the eUICC to which the LPA that sends the profile request belongs is invalid, and downloading is rejected. For example, it may be determined, based on the acknowledgement code, whether the eUICC that sends the profile request is a valid eUICC, and further, a profile associated with the eUICC may be searched for based on a card identifier of the eUICC.

312. The eUICC downloads the target profile from the download server.

313. The eUICC sends, to the user terminal, prompt information used to indicate that the target profile is successfully downloaded to the eUICC.

314. The user terminal outputs the prompt information.

In another optional implementation, if the LPA indication information instructs to download the profile by using the LPA in the user terminal, the user terminal downloads the target profile from the download server by using the LPA in the user terminal, and sends the target profile to the eUICC.

Specifically, in this optional implementation, if the LPA indication information instructs to download the profile by using the LPA in the user terminal, the user terminal may send, to the download server by using an LPD included in the LPA in the user terminal, a profile download request used to request to download the target profile. After receiving a download allowing response sent by the download server, the user terminal may download the target profile from the download server by using the LPA in the user terminal. Further, the user terminal may send the downloaded target profile to the eUICC, to install the target profile in the eUICC. After the target profile is successfully installed in the eUICC, the user terminal may output, by using an LUI included in the LPA in the user terminal, prompt information used to indicate that the target profile is successfully downloaded to the eUICC.

For details about steps 302, 306, 307, 309, and 310, and steps 312 to 314 in FIG. 3A and FIG. 3B, refer to related descriptions in FIG. 2A and FIG. 2B. The details are not described herein again.

It should be noted that the operations performed by the user terminal may also be performed by the LPA in the user terminal.

In the method procedure described in FIG. 3A and FIG. 3B, the LPA indication information is set before the eUICC is delivered. When an LPA is deployed in both the user terminal and the eUICC, and the profile needs to be downloaded, the user terminal may obtain the LPA indication information by receiving the LPA indication information sent by the eUICC, and select, based on the LPA indication information, the LPA in the eUICC or the LPA in the user terminal to download the profile, so that the profile can be downloaded, and a conflict between the LPA in the user terminal and the LPA in the eUICC can be avoided.

Figure 4A:
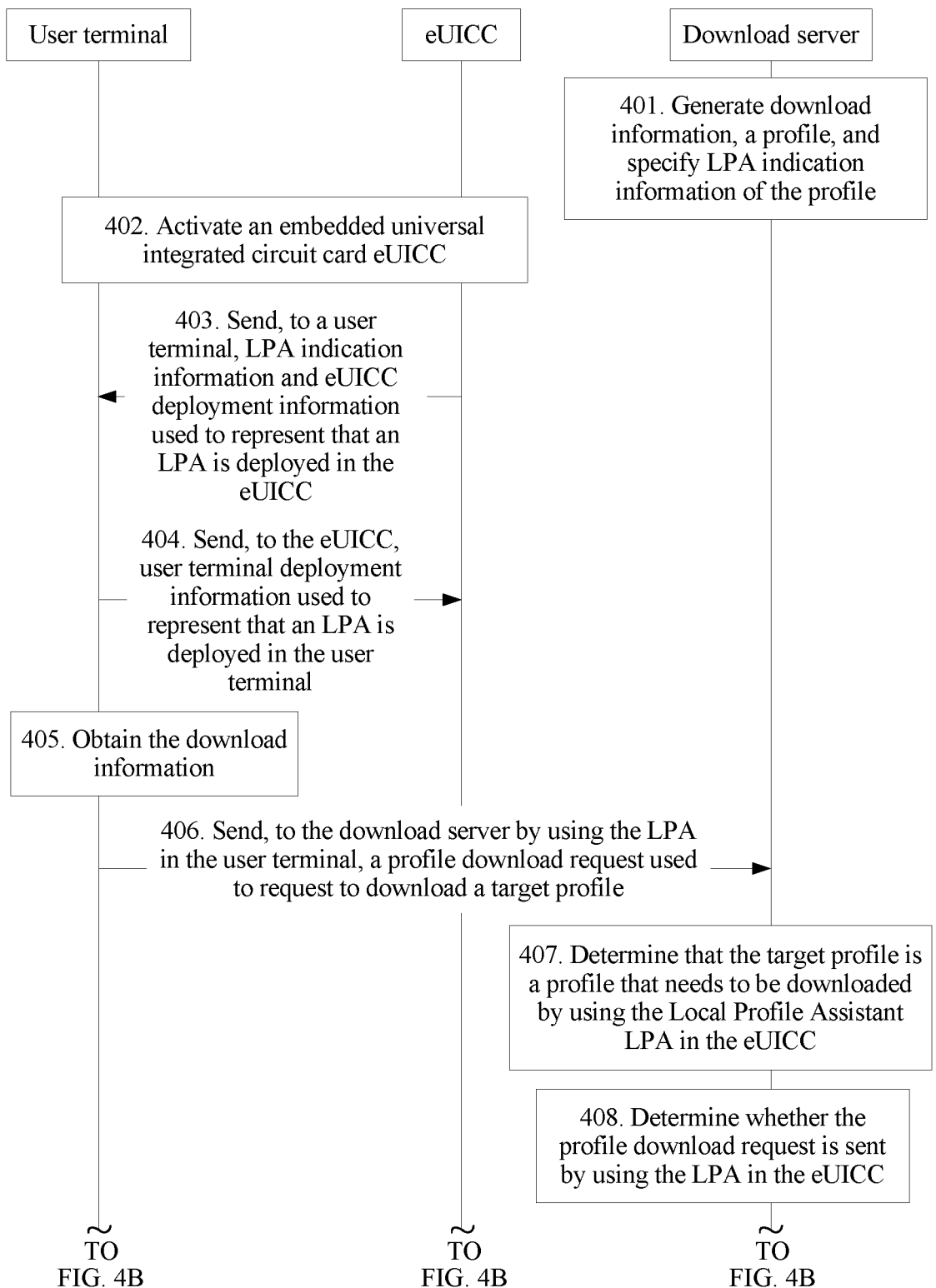
FIG. 4A, FIG. 4B, and FIG. 4C are a schematic flowchart of another profile download method according to an embodiment of the present invention.
Figure 4B:
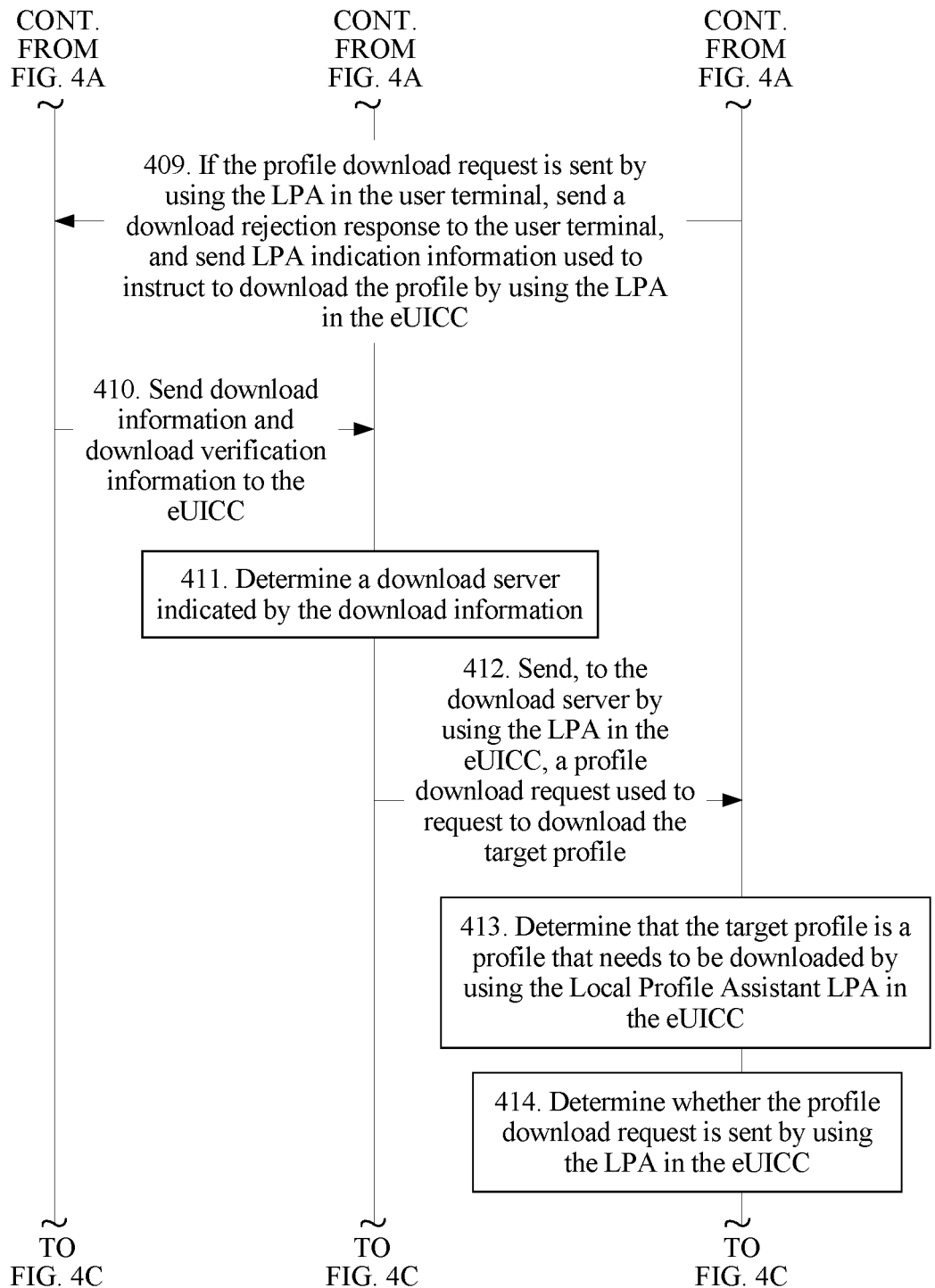
Figure 4C:
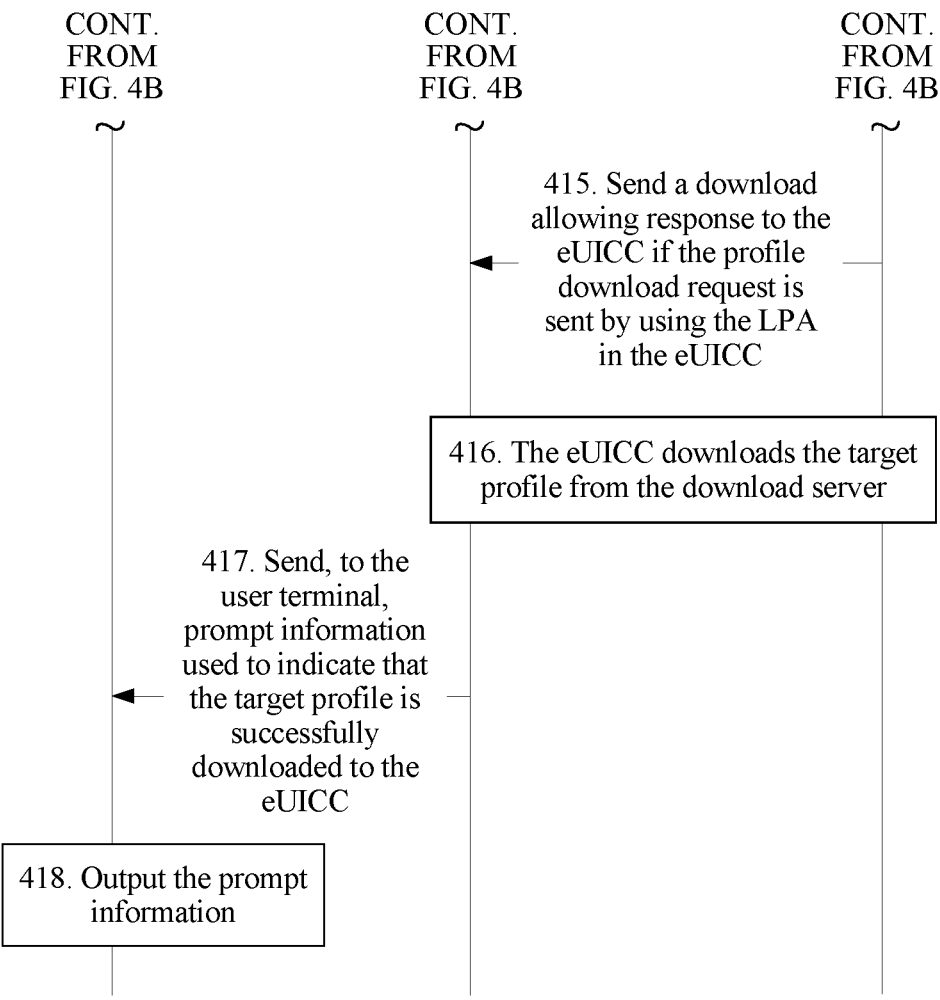

Based on the network architecture shown in FIG. 1, the embodiments of the present invention disclose a profile download method. Referring to FIG. 4A, FIG. 4B, and FIG. 4C, FIG. 4A, FIG. 4B, and FIG. 4C are a schematic flowchart of a profile download method according to an embodiment of the present invention. The method is described from a plurality of perspectives of a user terminal, an eUICC, a download server, and the like, and an LPA is deployed in both the user terminal and the eUICC. As shown in FIG. 4A, FIG. 4B, and FIG. 4C, the profile download method may include the following steps.

401. The download server generates download information and a profile, and specifies LPA indication information of the profile.

In this embodiment of the present invention, the download server may indicate the LPA indication information of the profile when generating the profile (Profile).

In the download server, some profiles (Profile) need to be downloaded by using the LPA in the eUICC, and it may be specified that the LPA indication information is LPA indicator=1; some profiles need to be downloaded by using the LPA in the user terminal, and it may be specified that the LPA indication information is LPA indicator=0; some profiles are not specified. Alternatively, the download server requires that all profiles requested to be downloaded from the download server need to be downloaded by using the LPA in the eUICC or by using the LPA in the user terminal.

The download information may be an activation code (Activation Code, AC) or a parameter directly defined in a form of a key-value key-value pair, for example, may include at least one of an address of an SM-DP server, an SM-DP identifier, and a profile identifier. When the download information is an activation code, the activation code may carry download information required for downloading the profile, for example, an address of the download server, an equipment identity of the download server, and an identifier of a target profile.

It should be noted that the activation code does not carry the LPA indication information.

402. The user terminal activates the embedded universal integrated circuit card eUICC.

403. The eUICC sends, to the user terminal, eUICC deployment information used to indicate that an LPA is deployed in the eUICC.

404. The user terminal sends, to the eUICC, user terminal deployment information used to indicate that an LPA is deployed in the user terminal.

405. The user terminal obtains the download information.

When the download information is an activation code, the user terminal may scan and parse the activation code, to obtain the download information that is required for downloading the profile and that is carried in the activation code.

Optionally, after step 405 and before step 406, the user terminal may further send a security authentication request to the eUICC. After the eUICC receives the security authentication request sent by the user terminal, the eUICC may send eUICC security information to the user terminal. The user terminal sends the received eUICC security information to the download server, to verify the eUICC security information to determine that the eUICC is valid, and complete bidirectional authentication between the eUICC and the download server. In this way, downloading of a profile from an invalid download server to an invalid eUICC can be avoided, and user information security is protected.

In an optional implementation, a manner in which the user terminal obtains the download information may be specifically:

sending, by the user terminal, a download information obtaining request to an operator portal server, and receiving the download information returned by the operator portal server; or sending, by the user terminal, a download information obtaining request to a subscription manager-discovery service SM-DS server, and receiving the download information returned by the SM-DS server.

In this optional implementation, the user terminal may directly obtain the download information without scanning the activation code. Specifically, the user terminal may request to obtain the download information from the operator portal server. For example, a user browses, by using the user terminal, a portal site launched by an operator, subscribes to a profile, and applies to access a network service of the operator. After the network service is accessed, the operator portal server returns download information of the subscribed profile to the user terminal.

Alternatively, the user terminal may request to obtain the download information from the SM-DS server by using an LDS in the user terminal. In this way, the download information returned by the SM-DS server can be received.

406. The user terminal sends, to the download server by using the LPA in the user terminal, a profile download request used to request to download a target profile.

The profile download request carries download verification information.

407. The download server determines that the target profile is a profile that needs to be downloaded by using the local profile assistant LPA in the eUICC.

In this embodiment of the present invention, after the download server receives the profile download request used to request to download the target profile, the download server may determine, by querying attribute information of the target profile, whether the target profile is a profile that needs to be downloaded by using the LPA in the eUICC.

408. The download server determines whether the profile download request is sent by using the LPA in the eUICC.

In this embodiment of the present invention, after the download server determines that the target profile is a profile that needs to be downloaded by using the LPA in the eUICC, the download server further needs to determine whether the profile download request is sent by using the LPA in the eUICC.

Specifically, the download server may check whether the profile download request is sent by using an interface between the LPA in the eUICC and the download server. If the download server determines that the profile download request is sent by using the LPA in the user terminal, the download server needs to reject the profile download request; or if the download server determines that the profile download request is sent by using the LPA in the eUICC, the download server may accept the profile download request.

409. If the profile download request is sent by using the LPA in the user terminal, the download server sends a download rejection response to the user terminal, and sends LPA indication information used to instruct to download the profile by using the LPA in the eUICC.

In this embodiment of the present invention, if the profile download request is sent by using the LPA in the user terminal, the download server may send, to the user terminal by using an interface between the LPA in the user terminal and the download server, the download rejection response and the LPA indication information used to instruct to download the profile by using the LPA in the eUICC, for example, LPA indicator=1.

410. The user terminal sends the download information and download verification information to the eUICC.

Specifically, after the user terminal receives the LPA indication information sent by the download server, the user terminal may further send the download information and the download verification information to the eUICC by using an interface between the LPA in the user terminal and the eUICC, for example, information such as an acknowledgement code, an international mobile equipment identity of the user terminal, and a card identifier of the eUICC. The download information may be information such as an activation code, an address of the download server, an equipment identity of the download server, and an identifier of the target profile.

411. The eUICC determines the download server indicated by the download information.

412. The eUICC sends, to the download server by using the LPA in the eUICC, a profile download request used to request to download the target profile.

The profile download request carries the download verification information.

413. The download server determines that the target profile is a profile that needs to be downloaded by using the local profile assistant LPA in the eUICC.

414. The download server determines whether the profile download request is sent by using the LPA in the eUICC.

415. The download server sends a download allowing response to the eUICC if the profile download request is sent by using the LPA in the eUICC.

Before sending the download allowing response to the eUICC, the download server may first determine whether the download verification information is correct. If the download verification information is correct, the eUICC to which the LPA that sends the profile request belongs is a valid eUICC that applies for the target profile. If the download verification information is incorrect, the eUICC to which the LPA that sends the profile request belongs is invalid, and downloading is rejected. For example, it may be determined, based on the acknowledgement code, whether the eUICC that sends the profile request is a valid eUICC, and further, a profile associated with the eUICC may be searched for based on the card identifier of the eUICC.

416. The eUICC downloads the target profile from the download server.

417. The eUICC sends, to the user terminal, prompt information used to indicate that the target profile is successfully downloaded to the eUICC.

418. The user terminal outputs the prompt information.

For details about steps 402 to 404 and steps 411 to 418 in FIG. 4A, FIG. 4B, and FIG. 4C, refer to related descriptions in FIG. 2A and FIG. 2B. The details are not described herein again.

It should be noted that the operations performed by the user terminal may also be performed by the LPA in the user terminal.

In the method procedure described in FIG. 4A, FIG. 4B, and FIG. 4C, the download server may specify the LPA indication information of the profile. When an LPA is deployed in both the user terminal and the eUICC, and the profile needs to be downloaded, the user terminal may obtain the LPA indication information by receiving the LPA indication information sent by the download server, and select, based on the LPA indication information, the LPA in the eUICC or the LPA in the user terminal to download the profile, so that the profile can be downloaded, and a conflict between the LPA in the user terminal and the LPA in the eUICC can be avoided.

Figure 5:
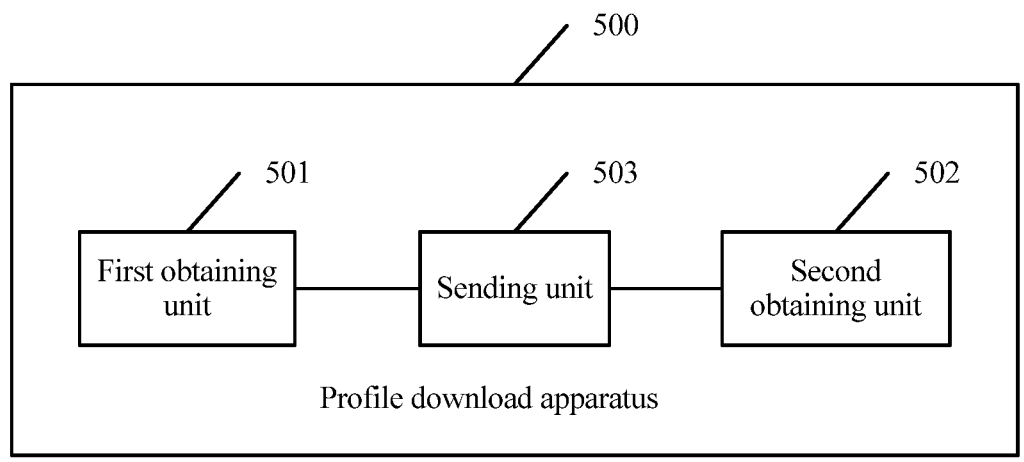
FIG. 5 is a schematic structural diagram of a profile download apparatus according to an embodiment of the present invention.

Based on the network architecture shown in FIG. 1, the embodiments of the present invention disclose a profile download apparatus. Referring to FIG. 5, FIG. 5 shows a profile download apparatus according to an embodiment of the present invention. The profile download apparatus is applied to a user terminal, and may be configured to perform some steps in the methods described in FIG. 2A to FIG. 4C. For details, refer to related descriptions in FIG. 2A to FIG. 4C, and the details are not described herein again. As shown in FIG. 5, the profile download apparatus 500 may include:

a first obtaining unit 501, configured to obtain local profile assistant LPA indication information;

a second obtaining unit 502, configured to obtain download information required for downloading a target profile; and a sending unit 503, configured to send the download information to an embedded universal integrated circuit card eUICC if the LPA indication information instructs to download the profile by using an LPA in the eUICC, so that the eUICC downloads, by using the LPA in the eUICC, the target profile from a download server indicated by the download information.

Optionally, the sending unit 503 is further configured to send download verification information to the eUICC if the LPA indication information instructs to download the profile by using the LPA in the embedded universal integrated circuit card eUICC. The download verification information includes at least one of the following: an acknowledgement code, an international mobile equipment identity of the user terminal, and a card identifier of the eUICC.

Figure 6:
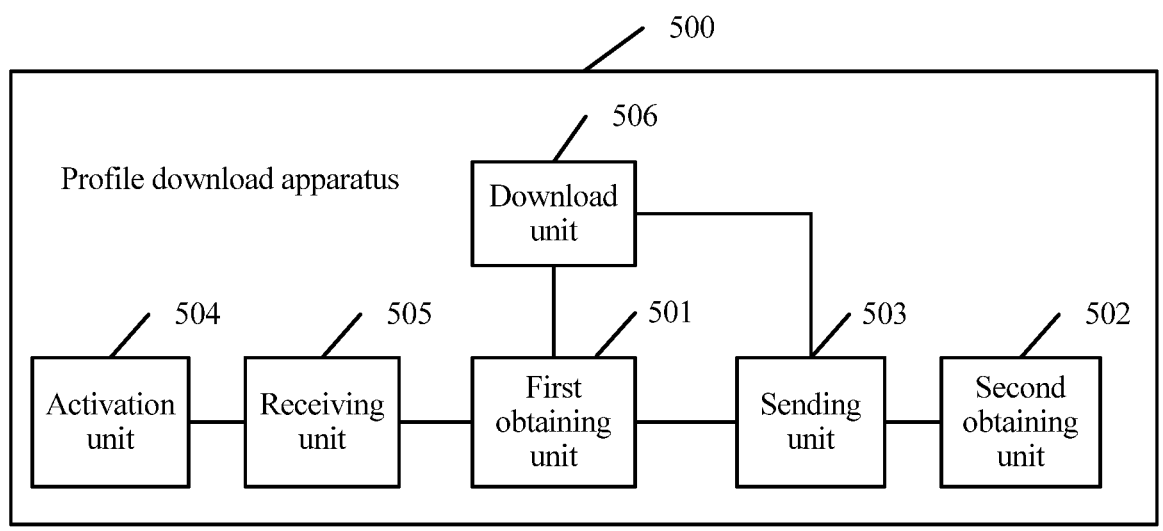
FIG. 6 is a schematic structural diagram of another profile download apparatus according to an embodiment of the present invention.

Based on the network architecture shown in FIG. 1, the embodiments of the present invention disclose a profile download apparatus. Referring to FIG. 6, FIG. 6 shows another profile download apparatus according to an embodiment of the present invention. The profile download apparatus is applied to a user terminal, and may be configured to perform some steps in the methods described in FIG. 2A to FIG. 4C. For details, refer to related descriptions in FIG. 2A to FIG. 4C, and the details are not described herein again. The profile download apparatus shown in FIG. 6 is obtained by further optimizing the profile download apparatus shown in FIG. 5. Compared with the profile download apparatus shown in FIG. 5, the profile download apparatus shown in FIG. 6 may include an activation unit 504 and a receiving unit 505 in addition to all units of the profile download apparatus shown in FIG. 5.

A manner in which the first obtaining unit 501 obtains local profile assistant LPA indication information is specifically: parsing an activation code to obtain the LPA indication information carried in the activation code; or sending a profile download request to the download server by using an LPA in the user terminal, and receiving the local profile assistant LPA indication information returned by the download server; or receiving the local profile assistant LPA indication information sent by the eUICC.

The download information includes at least one of the following: the activation code, an address of the download server, an equipment identity of the download server, and an identifier of the target profile.

A manner in which the first obtaining unit 501 receives the local profile assistant LPA indication information sent by the eUICC is specifically: after the eUICC is activated, receiving the LPA indication information sent by the eUICC; or after a request for obtaining authentication information of the eUICC is sent to the eUICC, receiving the LPA indication information sent by the eUICC.

Optionally, a manner in which the first obtaining unit 501 obtains local profile assistant LPA indication information is specifically: sending a download information obtaining request to an operator portal server, and receiving the local profile assistant LPA indication information returned by the operator portal server; or sending a download information obtaining request to a subscription manager-discovery service SM-DS server, and receiving the local profile assistant LPA indication information returned by the SM-DS server, where the LPA indication information in the SM-DS server is carried in a notification message sent by a subscription manager-data preparation SM-DP server to the SM-DS server.

The activation unit 504 is configured to activate the eUICC before the first obtaining unit obtains the local profile assistant LPA indication information.

The receiving unit 505 is configured to receive eUICC deployment information that is sent by the eUICC and that is used to indicate that an LPA is deployed in the eUICC.

Optionally, the profile download apparatus 500 shown in FIG. 6 may further include: a download unit 506, configured to: if the LPA indication information instructs to download the profile by using the LPA in the user terminal, download the target profile from the download server by using the LPA in the user terminal, where the sending unit 503 is further configured to send the target profile to the eUICC.

The sending unit 503 is further configured to send download verification information to the eUICC if the LPA indication information instructs to download the profile by using the LPA in the embedded universal integrated circuit card eUICC. The download verification information includes at least one of the following: an acknowledgement code, an international mobile equipment identity of the user terminal, and a card identifier of the eUICC.

In the profile download apparatus 500 described in FIG. 5 and FIG. 6, when an LPA is deployed in both the user terminal and the eUICC, and the profile needs to be downloaded, the LPA in the eUICC or the LPA in the user terminal may be selected, based on the LPA indication information obtained by the first obtaining unit 501, to download the profile. Therefore, the profile can be downloaded, and a conflict between the LPA in the user terminal and the LPA in the eUICC can be avoided.

Figure 7:
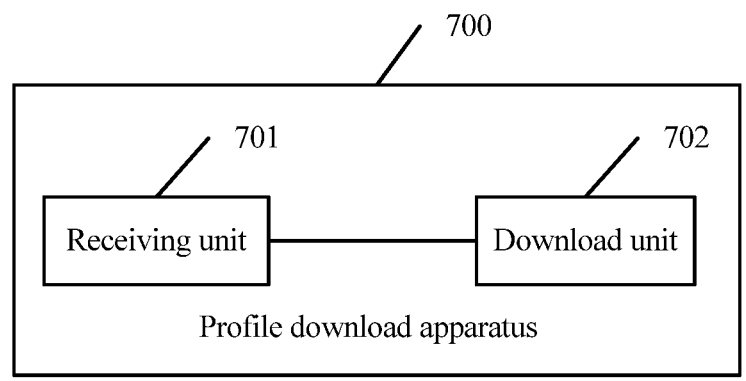
FIG. 7 is a schematic structural diagram of another profile download apparatus according to an embodiment of the present invention.

Based on the network architecture shown in FIG. 1, the embodiments of the present invention disclose a profile download apparatus. Referring to FIG. 7, FIG. 7 shows another profile download apparatus according to an embodiment of the present invention. The profile download apparatus is applied to an embedded universal integrated circuit card eUICC, and may be configured to perform some steps in the methods described in FIG. 2A to FIG. 4C. For details, refer to related descriptions in FIG. 2A to FIG. 4C, and the details are not described herein again. As shown in FIG. 7, the profile download apparatus 700 may include: a receiving unit 701, configured to receive download information sent by a user terminal; and a download unit 702, configured to download, by using an LPA in the eUICC, a target profile from a download server indicated by the download information.

Figure 8:
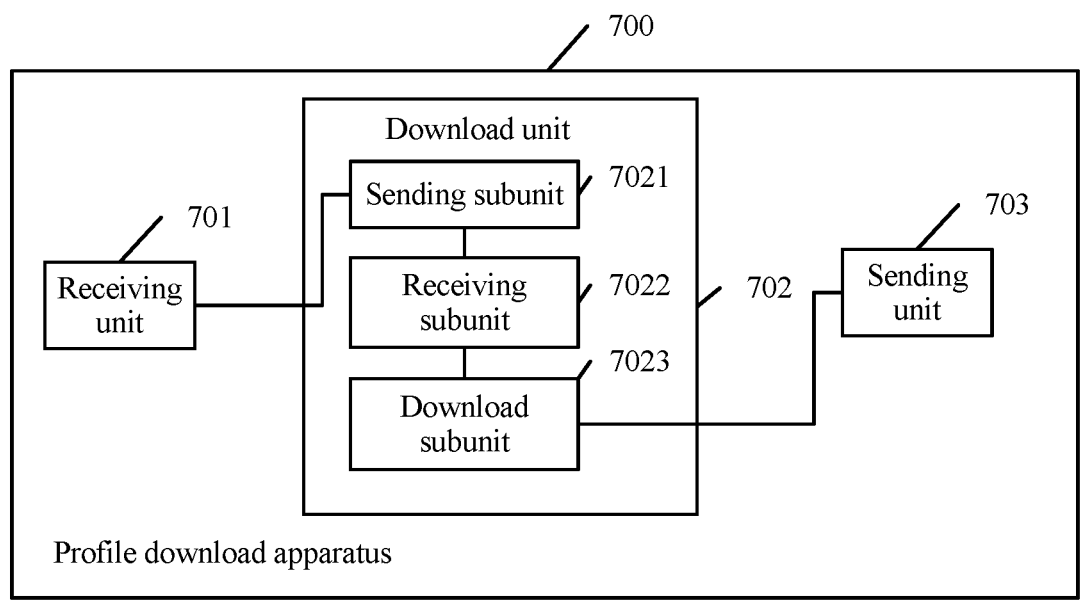
FIG. 8 is a schematic structural diagram of another profile download apparatus according to an embodiment of the present invention.

Based on the network architecture shown in FIG. 1, the embodiments of the present invention disclose a profile download apparatus. Referring to FIG. 8, FIG. 8 shows another profile download apparatus according to an embodiment of the present invention. The profile download apparatus is applied to an embedded universal integrated circuit card eUICC, and may be configured to perform some steps in the methods described in FIG. 2A to FIG. 4C. For details, refer to related descriptions in FIG. 2A to FIG. 4C, and the details are not described herein again. The profile download apparatus shown in FIG. 8 is obtained by further optimizing the profile download apparatus shown in FIG. 7. Compared with the profile download apparatus shown in FIG. 7, the profile download apparatus shown in FIG. 8 includes all units of the profile download apparatus shown in FIG. 7, and in addition, the download unit 702 may include: a sending subunit 7021, configured to send, by using the LPA in the eUICC to the download server indicated by the download information, a profile download request used to request to download the target profile; a receiving subunit 7022, configured to receive a download allowing response sent by the download server in response to the profile download request; and a download subunit 7023, configured to download the target profile from the download server.

In the profile download apparatus 700 shown in FIG. 7 and FIG. 8, the receiving unit 701 may receive the download information sent by the user terminal. Further, the download unit 702 directly downloads, by using the LPA in the eUICC instead of an LPA in the user terminal, the target profile from the download server indicated by the download information. Therefore, not only the profile can be downloaded, but also a conflict between the LPA in the user terminal and the LPA in the eUICC can be avoided.

Figure 9:
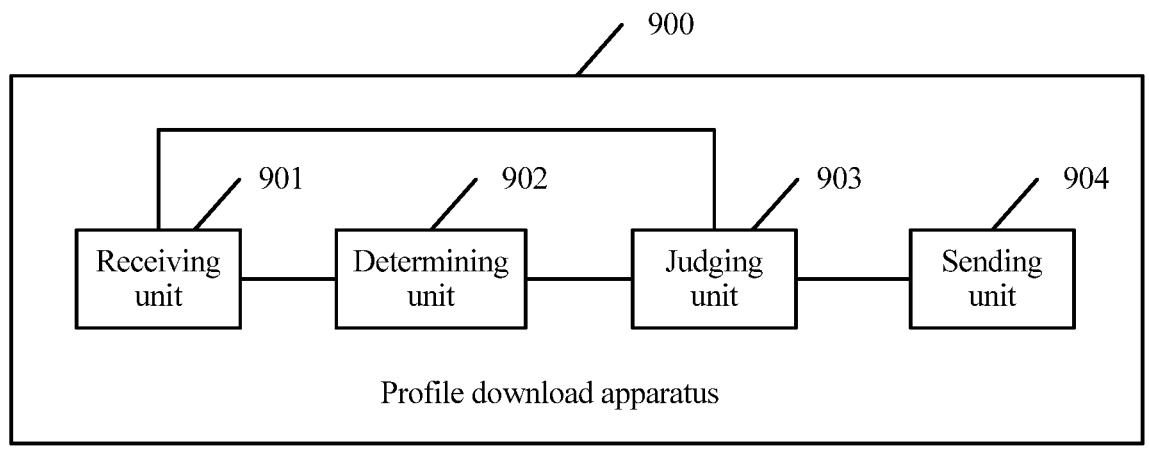
FIG. 9 is a schematic structural diagram of another profile download apparatus according to an embodiment of the present invention.

Based on the network architecture shown in FIG. 1, the embodiments of the present invention disclose a profile download apparatus. Referring to FIG. 9, FIG. 9 shows another profile download apparatus according to an embodiment of the present invention. The profile download apparatus is applied to a download server, and may be configured to perform some steps in the methods described in FIG. 2A to FIG. 4C. For details, refer to related descriptions in FIG. 2A to FIG. 4C, and the details are not described herein again. As shown in FIG. 9, the profile download apparatus 900 may include: a receiving unit 901, configured to receive a profile download request used to request to download a target profile; a determining unit 902, configured to determine that the target profile is a profile that needs to be downloaded by using a local profile assistant LPA in an embedded universal integrated circuit card eUICC; a judging unit 903, configured to determine whether the profile download request is sent by using the LPA in the eUICC; and a sending unit 904, configured to send a download allowing response to the eUICC when the judging unit 903 determines that the profile download request is sent by using the LPA in the eUICC, to allow the eUICC to download the target profile.

Optionally, the sending unit 904 is further configured to send a download rejection response to a user terminal when the judging unit 903 determines that the profile download request is sent by using an LPA in the user terminal.

The sending unit 904 is further configured to send LPA indication information used to instruct to download the profile by using the LPA in the eUICC, so that the user terminal sends, to the eUICC, download information required for downloading the profile, and the eUICC downloads the target profile from the download server by using the LPA in the eUICC.

In the profile download apparatus 900 described in FIG. 9, after the receiving unit 901 receives the profile download request used to request to download the target profile, the determining unit 902 determines that the target profile is a profile that needs to be downloaded by using the LPA in the eUICC, the judging unit 903 needs to determine whether the profile download request is sent by using the LPA in the eUICC, and if yes, the sending unit 904 sends the download allowing response to the eUICC, to allow the eUICC to download the target profile. In this way, it can be ensured that the target profile is downloaded by using the LPA in the eUICC, so that the profile is downloaded, and in addition, a conflict between the LPA in the user terminal and the LPA in the eUICC is avoided.

Figure 10:
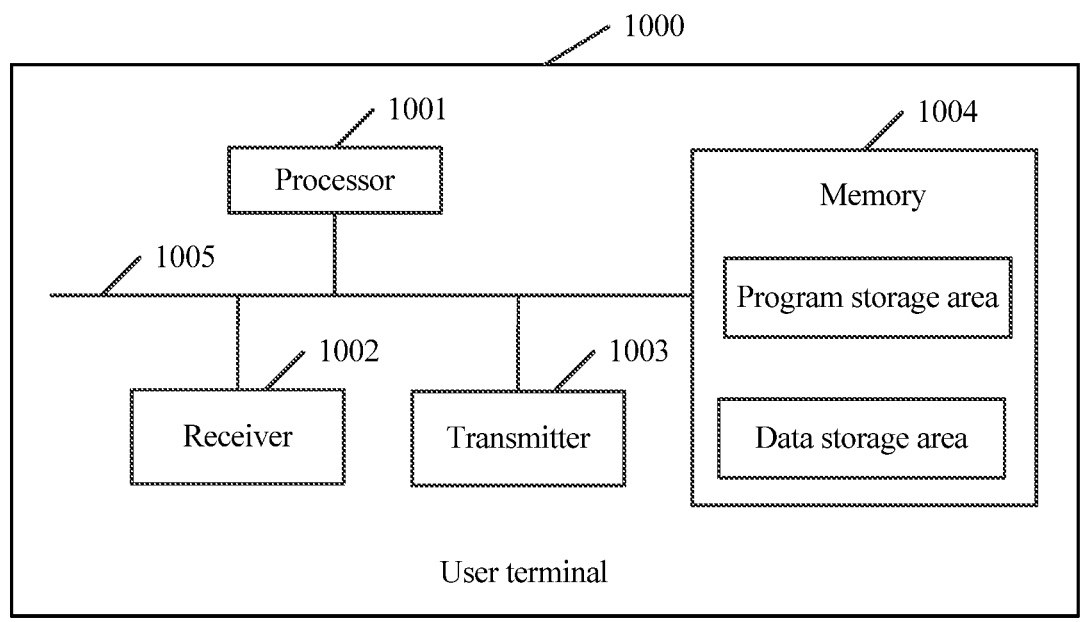
FIG. 10 is a schematic structural diagram of a user terminal according to an embodiment of the present invention.

Based on the network architecture shown in FIG. 1, the embodiments of the present invention disclose a user terminal. Referring to FIG. 10, FIG. 10 is a schematic structural diagram of a user terminal according to an embodiment of the present invention. The user terminal may be configured to perform some steps in the methods described in FIG. 2A to FIG. 4C. For details, refer to related descriptions in FIG. 2A to FIG. 4C, and the details are not described herein again. As shown in FIG. 10, the user terminal 1000 may include a processor 1001, a receiver 1002, a transmitter 1003, and a memory 1004. These components perform communication by using one or more communications buses 1005. Persons skilled in the art may understand that a structure of the user terminal shown in FIG. 10 imposes no limitation on the present invention. The structure may be a bus structure or a star structure, and may include more or fewer parts than those shown in FIG. 10, or combine some parts, or have different part arrangements. In this embodiment of the present invention, the user terminal shown in FIG. 10 includes but is not limited to various mobile Internet devices such as a mobile phone, a mobile computer, a tablet, a personal digital assistant (Personal Digital Assistant, PDA), a smart watch, smart glasses, and a smart band.

The processor 1001 is a control center of the user terminal, and is connected to all parts of the entire user terminal by using various interfaces and lines. The processor 1001 performs various functions of the user terminal and/or processes data by running or executing program code and/or a module that are/is stored in the memory 1004 and invoking data stored in the memory 1004. The processor unit may include an integrated circuit (Integrated Circuit, IC for short), for example, may include a singly-encapsulated IC or may include a plurality of connected encapsulated ICs with a same function or different functions. For example, the processor 1001 may include only a central processing unit (Central Processing Unit, CPU for short), or may be a combination of a CPU, a digital signal processor (Digital Signal Processor, DSP for short), a graphics processing unit (Graphic Processing Unit, GPU for short), and a control chip (for example, a baseband chip) in a communications unit. In an implementation of the present invention, the CPU may be a single computing core, or may include a plurality of computing cores.

The receiver 1002 is configured to implement information exchange between the user terminal and another device (for example, a download server). For example, the receiver 1002 is an antenna in the user terminal.

The transmitter 1003 is configured to implement information exchange between the user terminal and another device (for example, a download server). For example, the transmitter 1003 is an antenna in the user terminal.

The memory 1004 may be configured to store program code and a module, and the processor 1001 runs the program code and the module that are stored in the memory 1004, to execute various functional applications of the user terminal and implement data processing. The memory 1004 mainly includes a program storage area and a data storage area. The program storage area may store an operating system, and program code required by at least one function, such as program code that identifies a cell that does not access a communications network. The data storage area may store data (such as audio data or a phone book) created based on use of the user terminal, and the like. In a specific implementation of the present invention, the memory 1004 may include a volatile memory, for example, a nonvolatile random access memory (Nonvolatile Random Access Memory, NVRAM for short), a phase change random access memory (Phase Change RAM, PRAM for short), or a magnetoresistive random access memory (magnetoresistive RAM, MRAM for short), and may further include a nonvolatile memory, for example, at least one magnetic storage component, an electrically erasable programmable read-only memory (Electrically Erasable Programmable Read-Only Memory, EEPROM for short), or a flash memory component such as an NOR flash memory (NOR flash memory) or an NAND flash memory (NAND flash memory). The nonvolatile memory stores an operating system and program code that are executed by the processor unit. The processor unit loads, from the nonvolatile memory, a running program and data to the memory, and stores digital content in a massive storage apparatus. The operating system includes various components and/or drivers that are configured to control and manage a regular system task, such as memory management, storage device control, or power management, and that facilitate communication between various software and hardware components. In an implementation of the present invention, the operating system may be the Android system of Google, the iOS system developed by Apple, the Windows operating system developed by Microsoft, or the like; or may be an embedded operating system such as VxWorks.

The program code may further include program code of any application installed on the user terminal, including but not limited to program code of an application such as a browser, an email, an instant message service, word processing, keyboard virtualization, a widget (Widget), encryption, digital copyright management, speech recognition, speech reproduction, positioning (such as a function provided by a Global Positioning System), or music playing.

In the user terminal shown in FIG. 10, the processor 1001 may be configured to invoke the program code stored in the memory 1004, to perform the following operations: obtaining local profile assistant LPA indication information, and obtaining download information required for downloading a target profile; and sending the download information to an embedded universal integrated circuit card eUICC if the LPA indication information instructs to download the profile by using an LPA in the eUICC, so that the eUICC downloads, by using the LPA in the eUICC, the target profile from a download server indicated by the download information.

Optionally, the obtaining local profile assistant LPA indication information includes: parsing an activation code to obtain the local profile assistant LPA indication information carried in the activation code; or controlling the transmitter 1003 to send a profile download request to the download server by using an LPA in the user terminal, and controlling the receiver 1002 to receive the local profile assistant LPA indication information returned by the download server; or receiving the local profile assistant LPA indication information sent by the eUICC.

Optionally, a manner of receiving the local profile assistant LPA indication information sent by the eUICC is specifically: after the eUICC is activated, receiving the LPA indication information sent by the eUICC; or after a request for obtaining authentication information of the eUICC is sent to the eUICC, receiving the LPA indication information sent by the eUICC.

Optionally, the obtaining local profile assistant LPA indication information includes: controlling the transmitter 1003 to send a download information obtaining request to an operator portal server, and controlling the receiver 1002 to receive the local profile assistant LPA indication information returned by the operator portal server; or controlling the transmitter 1003 to send a download information obtaining request to a subscription manager-discovery service SM-DS server, and controlling the receiver 1002 to receive the local profile assistant LPA indication information returned by the SM-DS server, where the LPA indication information in the SM-DS server is carried in a notification message sent by a subscription manager-data preparation SM-DP server to the SM-DS server.

Optionally, the processor 1001 is further configured to invoke the program code stored in the memory 1004 to perform the following step: sending download verification information to the eUICC if the LPA indication information instructs to download the profile by using the LPA in the embedded universal integrated circuit card eUICC, where the download verification information includes at least one of the following: an acknowledgement code, an international mobile equipment identity of the user terminal, and a card identifier of the eUICC.

Optionally, the processor 1001 is further configured to invoke the program code stored in the memory 1004 to perform the following steps: if the LPA indication information instructs to download the profile by using the LPA in the user terminal, downloading the target profile from the download server by using the LPA in the user terminal, and sending the target profile to the eUICC.

Optionally, before the obtaining local profile assistant LPA indication information, the processor 1001 is further configured to invoke the program code stored in the memory 1004 to perform the following steps: activating the eUICC, and receiving eUICC deployment information that is sent by the eUICC and that is used to indicate that an LPA is deployed in the eUICC.

Optionally, the download information includes at least one of the following: the activation code, an address of the download server, an equipment identity of the download server, and an identifier of the target profile.

It may be understood that functions of each module in the user terminal 1000 in this embodiment may be specifically implemented according to the methods in the foregoing method embodiments. For a specific implementation process, refer to related descriptions of the foregoing method embodiments. Details are not described herein again.

It can be learned that the user terminal 1000 described in FIG. 10 may obtain the LPA indication information, select, based on the LPA indication information, the LPA in the eUICC or the LPA in the user terminal to download the profile. Therefore, the profile can be downloaded, and a conflict between the LPA in the user terminal and the LPA in the eUICC can be avoided.

Figure 11:
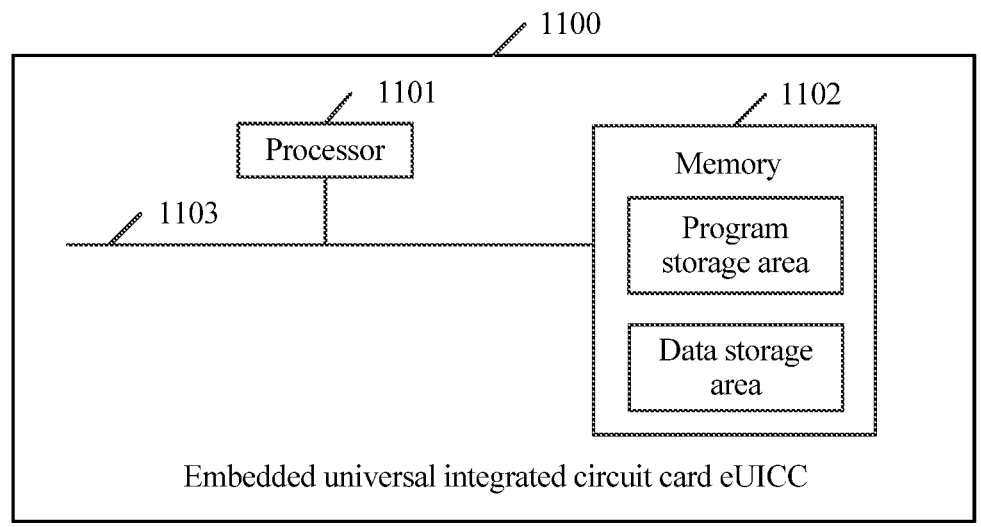
FIG. 11 is a schematic structural diagram of an embedded universal integrated circuit card eUICC according to an embodiment of the present invention.

Based on the network architecture shown in FIG. 1, the embodiments of the present invention disclose an embedded universal integrated circuit card eUICC. Referring to FIG. 11, FIG. 11 is a schematic structural diagram of an embedded universal integrated circuit card eUICC according to an embodiment of the present invention. The eUICC may be configured to perform some steps in the methods described in FIG. 2A to FIG. 4C. For details, refer to related descriptions in FIG. 2A to FIG. 4C, and the details are not described herein again. As shown in FIG. 11, the eUICC 1100 may include a processor 1101 and a memory 1102. These components perform communication by using one or more communications buses 1103. Persons skilled in the art may understand that a structure of the eUICC shown in FIG. 11 imposes no limitation on the present invention. The structure may be a bus structure or a star structure, and may include more or fewer parts than those shown in FIG. 11, or combine some parts, or have different part arrangements.

The processor 1101 is configured to invoke program code stored in the memory 1102 to perform the following steps: receiving download information sent by a user terminal; and downloading, by using an LPA in the eUICC, a target profile from a download server indicated by the download information.

Optionally, the downloading, by using an LPA in the eUICC, a target profile from a download server indicated by the download information includes: sending, by using the LPA in the eUICC to the download server indicated by the download information, a profile download request used to request to download the target profile; and receiving a download allowing response sent by the download server in response to the profile download request, and downloading the target profile from the download server.

It may be understood that functions of each module in the embedded universal integrated circuit card eUICC 1100 in this embodiment may be specifically implemented according to the methods in the foregoing method embodiments. For a specific implementation process, refer to related descriptions of the foregoing method embodiments. Details are not described herein again.

It can be learned that in the eUICC 1100 described in FIG. 11, the eUICC receives the download information sent by the user terminal, downloads, by using the LPA in the eUICC instead of the LPA in the user terminal, the target profile from the download server indicated by the download information. Therefore, not only the profile can be downloaded, but also a conflict between the LPA in the user terminal and the LPA in the eUICC can be avoided.

Figure 12:
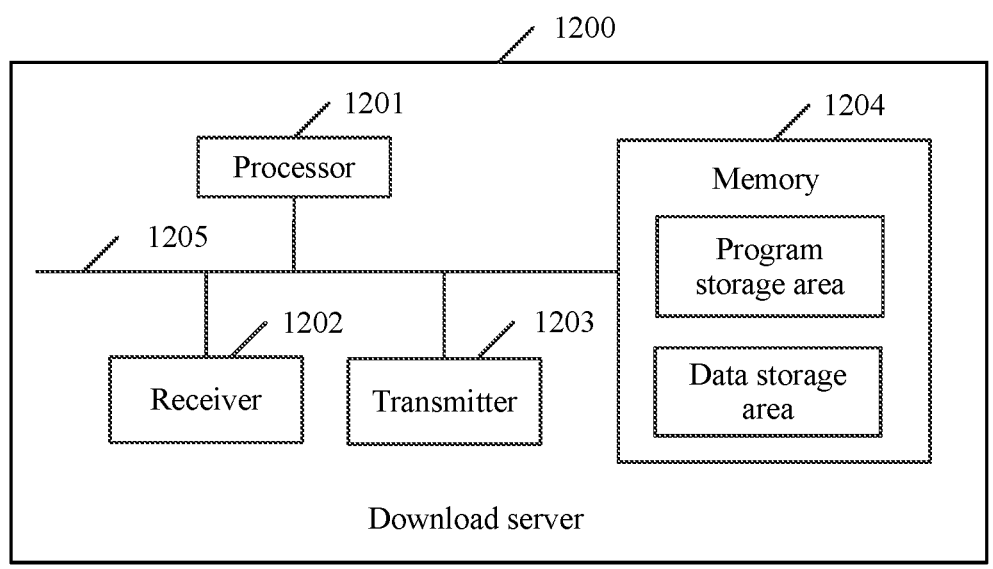
FIG. 12 is a schematic structural diagram of a download server according to an embodiment of the present invention.

Based on the network architecture shown in FIG. 1, the embodiments of the present invention disclose a download server. Referring to FIG. 12, FIG. 12 is a schematic structural diagram of a download server according to an embodiment of the present invention. The download server may be configured to perform some steps in the methods described in FIG. 2A to FIG. 4C. For details, refer to related descriptions in FIG. 2A to FIG. 4C, and the details are not described herein again. As shown in FIG. 12, the download server 1200 may include a processor 1201, a receiver 1202, a transmitter 1203, and a memory 1204. These components perform communication by using one or more communications buses. Persons skilled in the art may understand that a structure of the download server shown in FIG. 12 imposes no limitation on the present invention. The structure may be a bus structure or a star structure, and may include more or fewer parts than those shown in FIG. 12, or combine some parts, or have different part arrangements. In this embodiment of the present invention, the download server 1200 shown in FIG. 12 may include but is not limited to at least one of an operator network server (Mobile Network Operator, MNO), a subscription manager-data Preparation (Subscription Manager-Data Preparation, SM-DP) server, a subscription manager-secure routing (Subscription Manager-Security Route, SM-SR) server, and a subscription manager-discovery service (Subscription Manager-Discovery Service, SM-DS) server.

The processor 1201 is configured to invoke program code stored in the memory 1204 to perform the following steps: controlling the receiver 1202 to receive a profile download request used to request to download a target profile; determining that the target profile is a profile that needs to be downloaded by using a local profile assistant LPA in an embedded universal integrated circuit card eUICC; and determining whether the profile download request is sent by using the LPA in the eUICC, and if yes, controlling the transmitter 1203 to send a download allowing response to the eUICC, to allow the eUICC to download the target profile.

Optionally, the processor 1201 is further configured to invoke the program code stored in the memory 1204 to perform the following steps: controlling the transmitter 1203 to send a download rejection response to a user terminal if the profile download request is sent by using an LPA in the user terminal; and controlling the transmitter 1203 to send, to the user terminal, LPA indication information used to instruct to download the profile by using the LPA in the eUICC, so that the user terminal sends, to the eUICC, download information required for downloading the profile, and the eUICC downloads the target profile from the download server by using the LPA in the eUICC.

It may be understood that functions of each module of the download server 1200 in this embodiment may be specifically implemented according to the methods in the foregoing method embodiments. For a specific implementation process, refer to related description in the foregoing method embodiments, and details are not described herein again.

It can be learned that in the download server 1200 described in FIG. 12, when determining that the target profile is a profile that needs to be downloaded by using the LPA in the eUICC, the download server may determine whether the profile download request is sent by using the LPA in the eUICC, to ensure that the target profile is downloaded by using the LPA in the eUICC, so that the profile is downloaded, and a conflict between the LPA in the user terminal and the LPA in the eUICC is avoided.

Figure 13:
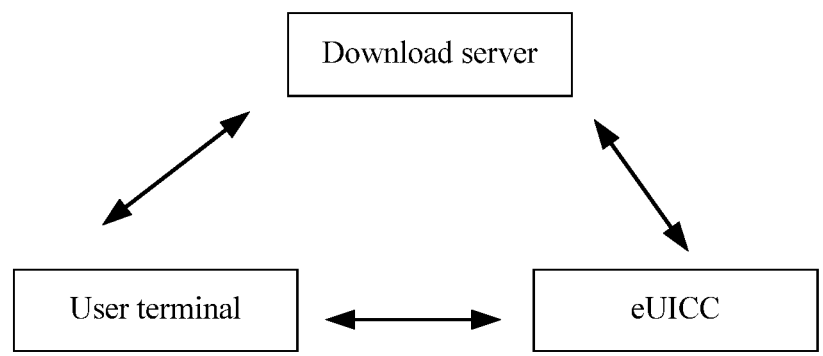
FIG. 13 is a schematic structural diagram of a profile download system according to an embodiment of the present invention.

Based on the network architecture shown in FIG. 1, the embodiments of the present invention disclose a schematic structural diagram of a profile download system. As shown in FIG. 13, the profile download system 1300 may include a download server 1301, a user terminal 1302, and an embedded universal integrated circuit card eUICC 1303. The download server 1301 may include the profile download apparatus 900 described in FIG. 9. The user terminal 1302 may include the profile download apparatus 500 described in FIG. 5 or FIG. 6. The embedded universal integrated circuit card eUICC 1303 may include the profile download apparatus 700 described in FIG. 7 or FIG. 8.

It should be noted that, for brief description, the foregoing method embodiments are represented as a series of actions. However, persons skilled in the art should appreciate that the present invention is not limited to the described order of the actions, because according to this application, some steps may be performed in other orders or simultaneously. It should be further appreciated by persons skilled in the art that the embodiments described in this specification all belong to preferred embodiments, and the involved actions and modules are not necessarily required by this application.

In the foregoing embodiments, the description of each embodiment has respective focuses. For a part that is not described in detail in an embodiment, refer to related descriptions in other embodiments.

The steps of the method in the embodiments of the present invention may be sequentially adjusted, combined, or deleted based on an actual requirement.

The units in the apparatus in the embodiments of the present invention may be combined, divided, and deleted based on an actual requirement.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (Read-Only Memory, ROM), a random access memory (Random Access Memory, RAM), a magnetic disk, and an optical disc.

The profile download method and system, and the related device provided in the embodiments of the present invention are described in detail above. The principle and implementation of the present invention are described in this specification by using specific examples. The description of the embodiments of the present invention is merely provided to help understand the method and core ideas of the present invention. In addition, persons of ordinary skill in the art can make modifications to the present invention in terms of the specific implementations and application scopes based on the ideas of the present invention. In conclusion, the content of this specification shall not be construed as a limit to the present invention.

The invention claimed is:

1. An electronic device, comprising:
   an embedded universal integrated circuit card (eUICC);
   a processor; and
   a memory coupled to the processor and configured to store programed instructions that, when executed by the processor, cause the electronic device to:
      select a second local profile assistant (LPA) stored in the eUICC to download a first profile, wherein the electronic device comprises a stored first LPA;
      obtain, by the eUICC, download information for downloading the first profile; and
      download, using the second LPA in the eUICC, the first profile from a download server indicated by the download information.

2. The electronic device of claim 1, wherein the programed instructions, when executed by the processor, cause the electronic device to select, based on LPA indication information, the second LPA in the eUICC to download the first profile, and wherein the LPA indication information indicates that the second LPA in the eUICC is to be used.

3. The electronic device of claim 2, wherein the programed instructions, when executed by the processor, further cause the electronic device to obtain the LPA indication information from the eUICC.

4. The electronic device of claim 2, wherein the programed instructions, when executed by the processor, further cause the electronic device to obtain the LPA indication information from an activation code.

5. The electronic device of claim 2, wherein the programed instructions, when executed by the processor, further cause the electronic device to obtain the LPA indication information from the download server.

6. The electronic device of claim 1, wherein the download information comprises an activation code.

7. The electronic device of claim 1, wherein each of the first LPA in the electronic device and the second LPA in the eUICC comprises at least one of a local discovery service (LDS), local profile download (LPD), or a local user interface UI interface (LUI).

8. The electronic device of claim 1, wherein the programed instructions, when executed by the processor, further cause the electronic device to display prompt information indicating that the first profile is successfully downloaded to the eUICC.

9. The electronic device of claim 1, wherein the programed instructions, when executed by the processor, further cause the electronic device to send capability information of the electronic device to the eUICC, and wherein the capability information comprises information indicating that an LPA is supported by the electronic device.

10. A method, implemented by an electronic device, comprising:
selecting a second local profile assistant (LPA in an embedded universal integrated circuit card (eUICC) to download a profile, wherein the electronic device comprises a first LPA in the electronic device and the second LPA in the eUICC;
obtaining download information for downloading a first profile by the eUICC; and
downloading, using the second LPA in the eUICC, the first profile from a download server indicated by the download information.

11. The method of claim 10, wherein the selecting the second LPA in the eUICC to download the profile comprises selecting, based on LPA indication information, the second LPA in the eUICC to download the profile, and wherein the LPA indication information indicates that the second LPA in the eUICC is to be used.

12. The method of claim 11, further comprising obtaining the LPA indication information from the eUICC.

13. The method of claim 11, further comprising obtaining the LPA indication information from an activation code.

14. The method of claim 11, further comprising obtaining the LPA indication information from the download server.

15. The method of claim 10, wherein the download information comprises an address of the download server.

16. The method of claim 10, wherein each of the first LPA in the electronic device and the second LPA in the eUICC comprises at least one of a local discovery service (LDS), local profile download (LPD), or a local user interface UI interface (LUI).

17. The method of claim 10, further comprising displaying prompt information indicating that the first profile is successfully downloaded to the eUICC.

18. The method of claim 10, further comprising sending capability information of the electronic device to the eUICC, wherein the capability information carries information indicating that an LPA is supported by the electronic device.

19. A computer program product comprising computer-executable instructions for storage on a non-transitory computer readable medium that, when executed by an electronic device, cause the electronic device to:
select a second LPA in an embedded universal integrated circuit card (eUICC) to download a profile, wherein the electronic device comprises a first local profile assistant (LPA) in the electronic device and the second LPA in the eUICC;
obtain download information for downloading a first profile by the eUICC; and
download, using the second LPA in the eUICC, the first profile from a download server indicated by the download information.

20. The computer program product of claim 19, wherein the download information comprises:
an equipment identity of the download server; and
an identifier of the first profile.

* * * * *

UNITED STATES PATENT AND TRADEMARK OFFICE
CERTIFICATE OF CORRECTION

PATENT NO. : 10,924,917 B2
APPLICATION NO. : 16/799131
DATED : February 16, 2021
INVENTOR(S) : Shunan Fan, Shuiping Long and Linyi Gao Page 1 of 1

It is certified that error appears in the above-identified patent and that said Letters Patent is hereby corrected as shown below:

In the Claims

Claim 10, Column 29, Line 25: "assistant (LPA in an" should read "assistant (LPA) in an".

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*